US008466929B2

(12) United States Patent
Hasegawa et al.

(10) Patent No.: US 8,466,929 B2
(45) Date of Patent: Jun. 18, 2013

(54) IMAGE PROCESSOR

(75) Inventors: Tomohiko Hasegawa, Nagoya (JP);
Masaki Kondo, Toyoake (JP)

(73) Assignee: Brother Kogyo Kabushiki Kaisha,
Nagoya-shi, Aichi-ken (JP)

( * ) Notice: Subject to any disclaimer, the term of this patent is extended or adjusted under 35 U.S.C. 154(b) by 659 days.

(21) Appl. No.: 12/414,343

(22) Filed: Mar. 30, 2009

(65) Prior Publication Data

US 2009/0249200 A1 Oct. 1, 2009

(30) Foreign Application Priority Data

Mar. 31, 2008 (JP) ................................ 2008-094196
Mar. 31, 2008 (JP) ................................ 2008-094224

(51) Int. Cl.
*G09G 5/02* (2006.01)
*G06F 17/00* (2006.01)
*G06F 15/00* (2006.01)

(52) U.S. Cl.
USPC ............ 345/589; 345/418; 345/501; 345/661

(58) Field of Classification Search
None
See application file for complete search history.

(56) References Cited

U.S. PATENT DOCUMENTS

| 7,417,667 | B2* | 8/2008 | Shibutani | 348/220.1 |
| 7,710,489 | B2* | 5/2010 | Misawa et al. | 348/333.05 |
| 8,000,558 | B2* | 8/2011 | Mori et al. | 382/276 |
| 2003/0229894 | A1* | 12/2003 | Okada et al. | 725/41 |
| 2004/0109063 | A1* | 6/2004 | Kusaka et al. | 348/207.1 |
| 2006/0050321 | A1 | 3/2006 | Takahashi | |
| 2007/0146504 | A1* | 6/2007 | Morimoto et al. | 348/231.3 |
| 2007/0223049 | A1* | 9/2007 | Araya et al. | 358/302 |
| 2007/0223878 | A1* | 9/2007 | Abe et al. | 386/95 |
| 2008/0076470 | A1* | 3/2008 | Ueda et al. | 455/556.1 |
| 2008/0175103 | A1* | 7/2008 | Nakamura et al. | 368/10 |

FOREIGN PATENT DOCUMENTS

| JP | H06-111083 A | 4/1994 |
| JP | H09-116853 A | 5/1997 |
| JP | H09-322113 A | 12/1997 |
| JP | 2000-138883 A | 5/2000 |
| JP | 2002-211049 A | 7/2002 |

(Continued)

OTHER PUBLICATIONS

Japan Patent Office; Office Action in Japanese Patent Application No. 2008-094196 (counterpart to the above captioned US application) mailed Jul. 20, 2010.

(Continued)

*Primary Examiner* — Kee M Tung
*Assistant Examiner* — Zhengxi Liu
(74) *Attorney, Agent, or Firm* — Baker Botts L.L.P.

(57) ABSTRACT

An image processor includes an extracting unit, an assigning unit, and an output unit. The extracting unit extracts at least one set of frame image data from the plurality of sets of frame image data included in one of the at least one set of moving image data. The assigning unit assigns a set of control data to each of the at least one set of frame image data extracted by the extracting unit. The output unit outputs an image list including a moving image index, the moving image index having an index frame image and information with respect to the set of control data, the index frame image being either one of a frame image corresponding to the at least one set of frame image data assigned with the set of control data and a resized frame image resized from the frame image.

13 Claims, 23 Drawing Sheets

FOREIGN PATENT DOCUMENTS

| | | |
|---|---|---|
| JP | 2004-355687 A | 12/2004 |
| JP | 2005-130254 A | 5/2005 |
| JP | 2005-130275 A | 5/2005 |
| JP | 2005-175822 A | 6/2005 |
| JP | 2006-080652 A | 3/2006 |
| JP | 2008-017500 A | 1/2008 |

OTHER PUBLICATIONS

Japan Patent Office; Office Action in Japanese Patent Application No. 2008-094224 (counterpart to the above-captioned U.S. patent application) mailed Apr. 20, 2010.

* cited by examiner

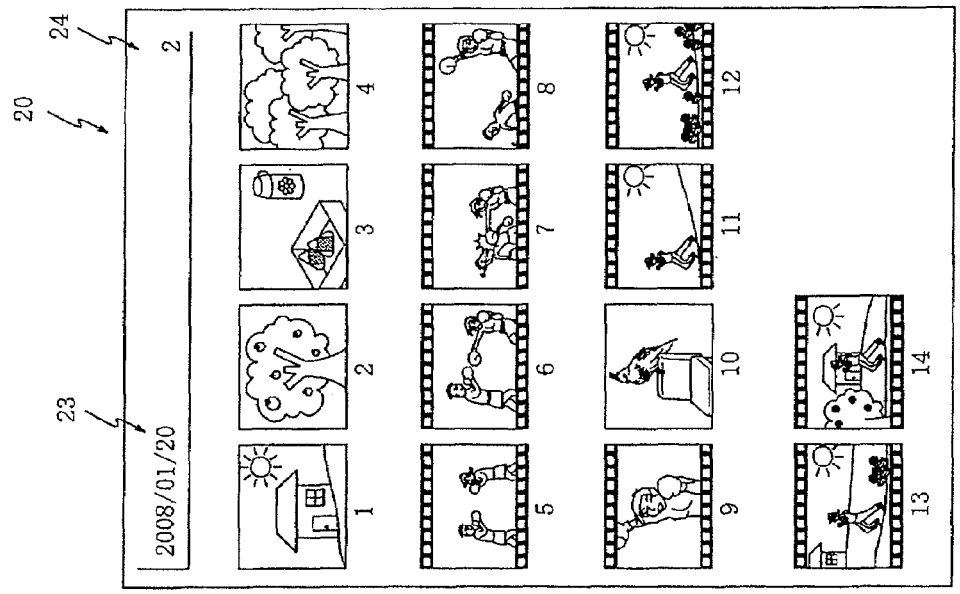
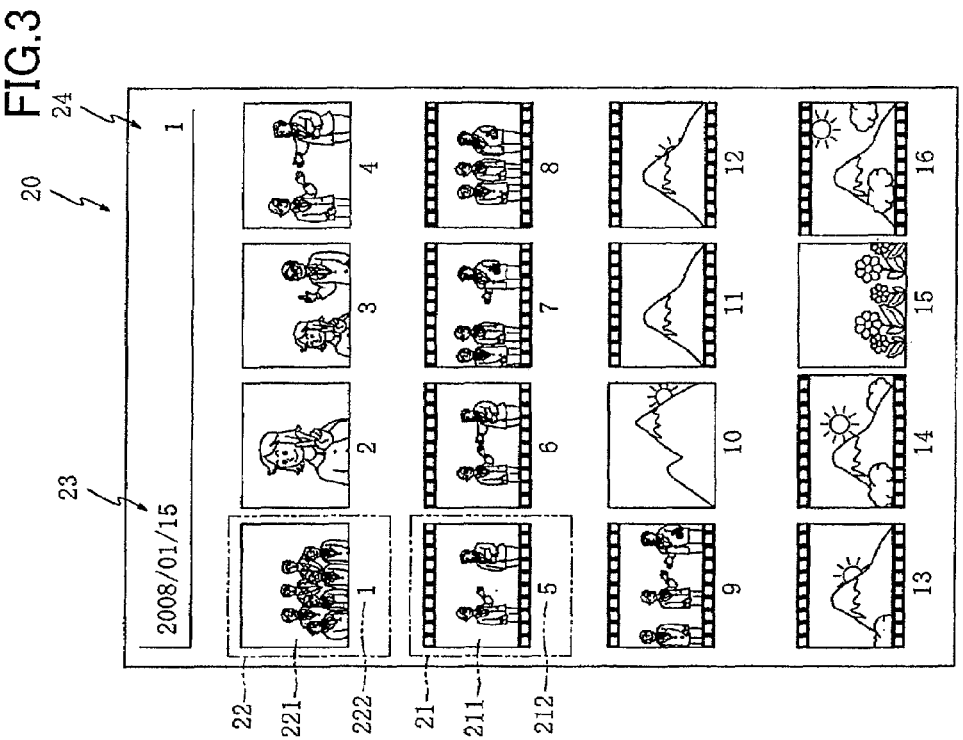
FIG.3

FIG.4

| 201 | 202 | 203 | 204 | 205 | 206 | 207 | 208 |
|---|---|---|---|---|---|---|---|
| 0 | "IMG01.jpg" | 0 | 1 | 1 | 0 | 20080115 | 125045 |
| 1 | "IMG02.avi" | 1 | 6 | 900 | 60 | 20080115 | 151320 |
| 2 | "IMG03.mov" | 2 | 7 | 1500 | 30 | 20080115 | 180632 |
| 3 | "IMG04.jpg" | 0 | 1 | 1 | 0 | 20080120 | 100516 |
| ... | | | | | | | |

| 301 | 302 | 303 | 304 | 305 | 306 |
|---|---|---|---|---|---|
| 0 | 0 | 1 | 0 | 20080115 | 125045 |
| 1 | 1 | 1 | 0 | 20080115 | 151320 |
| 2 | 1 | 1 | 180 | 20080115 | 151326 |
| 3 | 1 | 1 | 360 | 20080115 | 151332 |
| 4 | 1 | 1 | 540 | 20080115 | 151338 |
| 5 | 1 | 1 | 720 | 20080115 | 151344 |
| 6 | 2 | 1 | 0 | 20080115 | 180632 |
| 7 | 2 | 1 | 300 | 20080115 | 180636 |
| 8 | 2 | 1 | 600 | 20080115 | 180640 |
| 9 | 2 | 1 | 900 | 20080115 | 180644 |
| 10 | 2 | 1 | 1200 | 20080115 | 180648 |
| 11 | 3 | 1 | 0 | 20080115 | 180652 |
| 12 | 4 | 1 | 0 | 20080115 | 180656 |
| 13 | 5 | 1 | 0 | 20080115 | 180700 |
| 14 | 6 | 2 | 0 | 20080120 | 100516 |

FIG.7

| 501 | 502 | 503 | 504 |
|---|---|---|---|
| 1 | 1 | 0 | 1 |
| 1 | 2 | 1 | 1 |
| 1 | 3 | 1 | 2 |
| 1 | 4 | 1 | 3 |
| 1 | 5 | 1 | 4 |
| 1 | 6 | 1 | 5 |
| 2 | 1 | 2 | 1 |
| 2 | 2 | 2 | 2 |
| 2 | 3 | 2 | 3 |
| 2 | 4 | 2 | 4 |
| 2 | 5 | 2 | 5 |
| 2 | 6 | 2 | 6 |
| 3 | 1 | 3 | 1 |
| 3 | 2 | 3 | 2 |
| 3 | 3 | 3 | 3 |

~13n (PROCESS IN MFP)

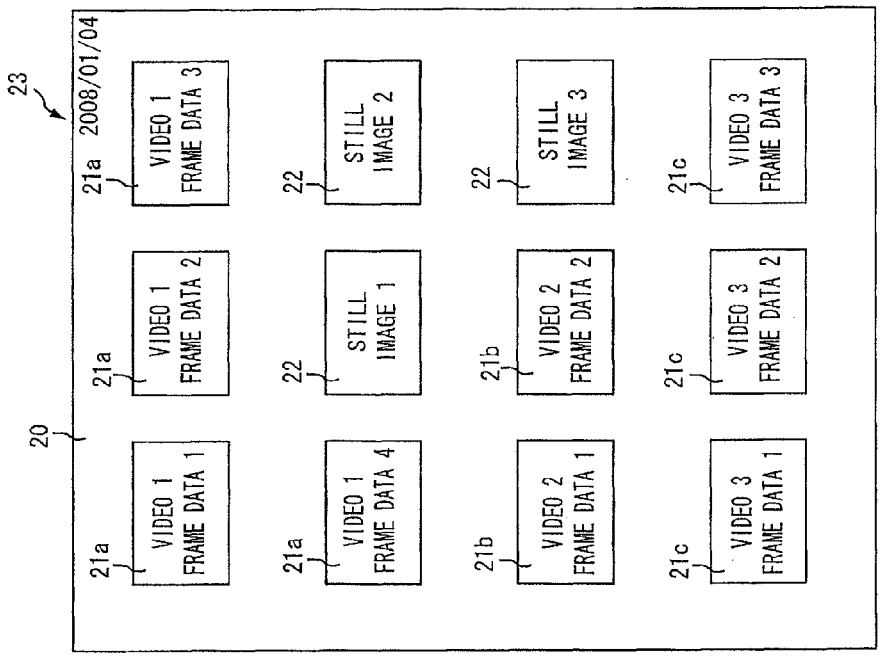
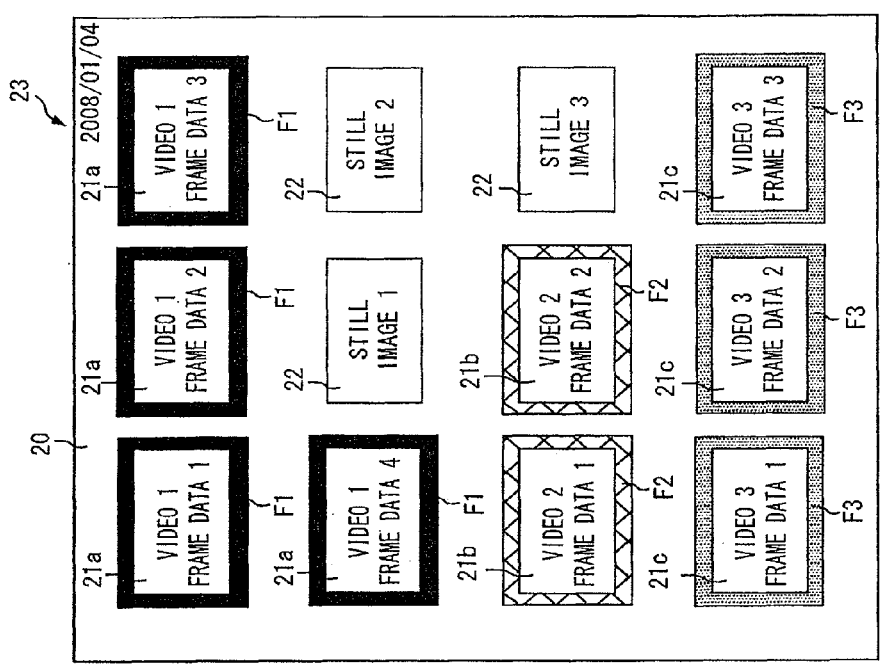

FIG.18

| 201 | 202 | 203 | 204 | 205 | 206 | 207 | 208 | 209 |
|---|---|---|---|---|---|---|---|---|
| 0 | "IMG01.jpg" | 0 | 1 | 1 | 0 | 20080115 | 125045 | 0 |
| 1 | "IMG02.avi" | 1 | 5 | 900 | 60 | 20080115 | 151320 | 33488896 |
| 2 | "IMG03.mov" | 2 | 5 | 1500 | 30 | 20080115 | 180632 | 31588096 |
| 3 | "IMG04.jpg" | 0 | 1 | 1 | 0 | 20080120 | 100516 | 0 |
| ... | | | | | | | | |

| 301 | 302 | 303 | 304 | 305 | 306 | 307 |
|---|---|---|---|---|---|---|
| 0 | 0 | | 0 | 20080115 | 125045 | 0 |
| 1 | 1 | 1 | 0 | 20080115 | 151320 | 33488896 |
| 2 | 1 | 1 | 180 | 20080115 | 151326 | 33488896 |
| 3 | 1 | 1 | 360 | 20080115 | 151332 | 33488896 |
| 4 | 1 | 1 | 540 | 20080115 | 151338 | 33488896 |
| 5 | 1 | 1 | 720 | 20080115 | 151344 | 33488896 |
| 6 | 2 | 1 | 0 | 20080115 | 180632 | 31588096 |
| 7 | 2 | 1 | 300 | 20080115 | 180636 | 31588096 |
| 8 | 2 | 1 | 600 | 20080115 | 180640 | 31588096 |
| 9 | 2 | 1 | 900 | 20080115 | 180644 | 31588096 |
| 10 | 2 | 1 | 1200 | 20080115 | 180648 | 31588096 |
| 11 | 3 | 1 | 0 | 20080115 | 180652 | 0 |
| 12 | 4 | 1 | 0 | 20080115 | 180656 | 0 |
| 13 | 5 | 1 | 0 | 20080115 | 180700 | 0 |
| 14 | 6 | 2 | 0 | 20080120 | 100516 | 0 |
| ... | | | | | | |

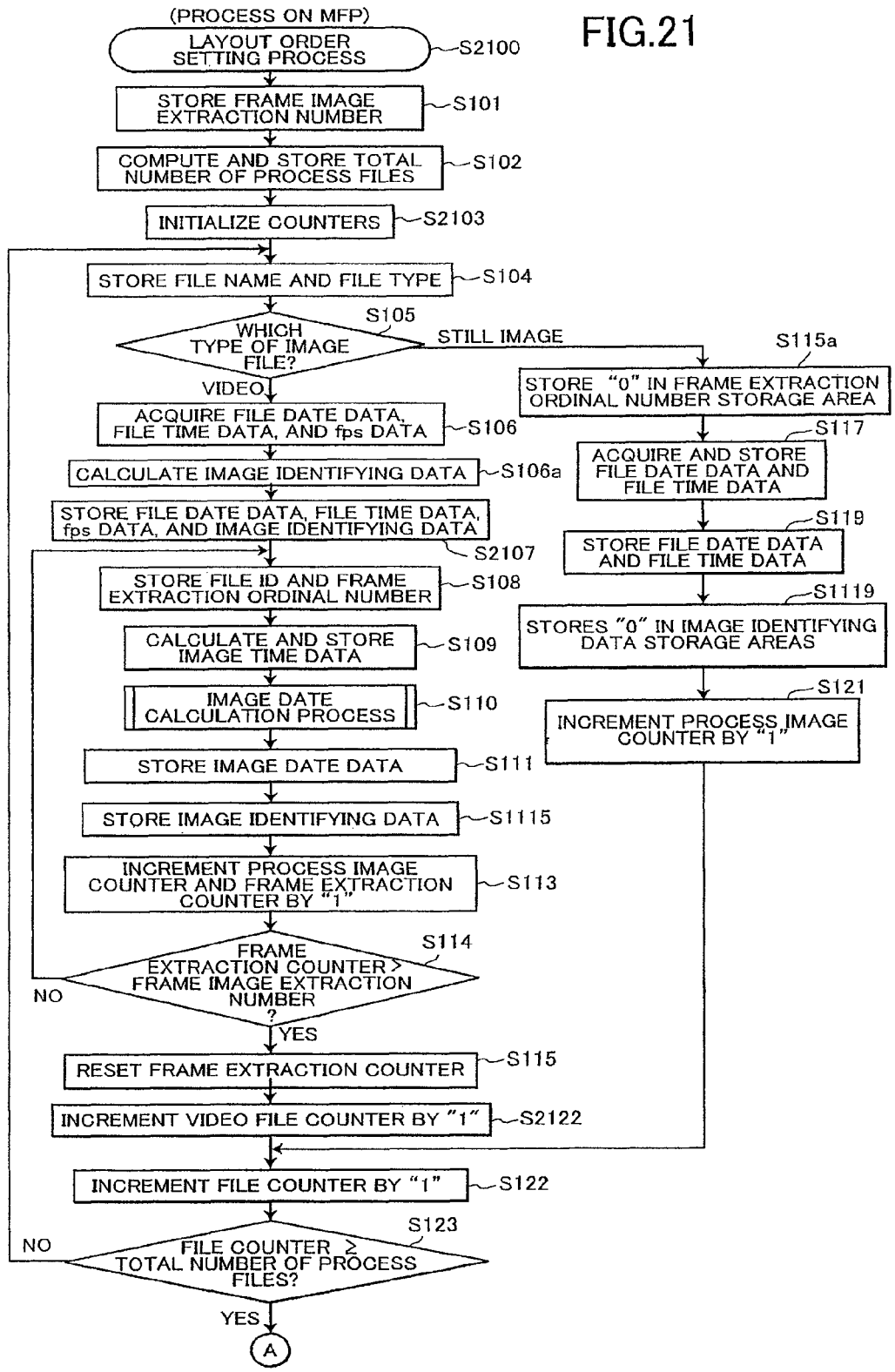

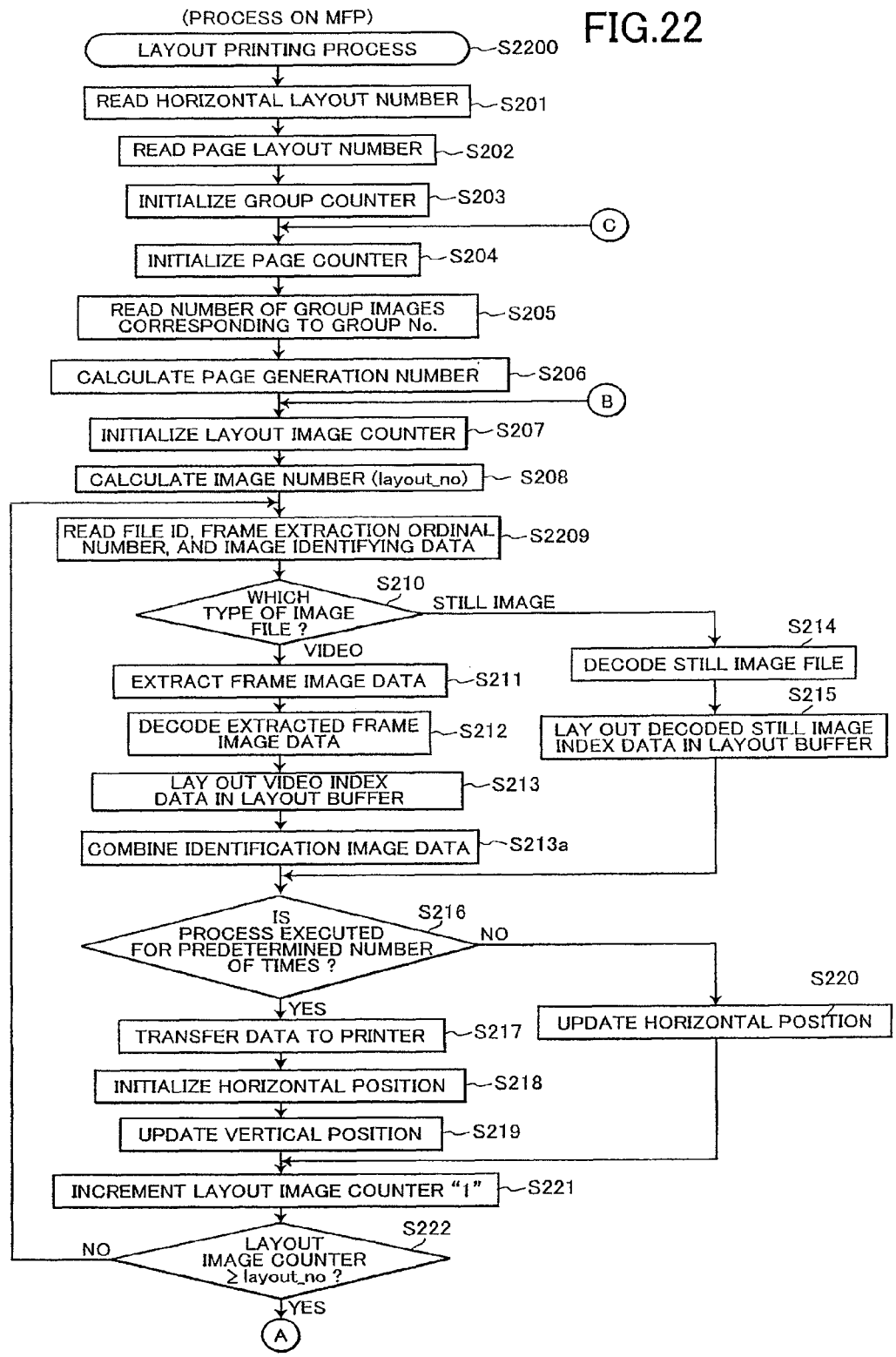

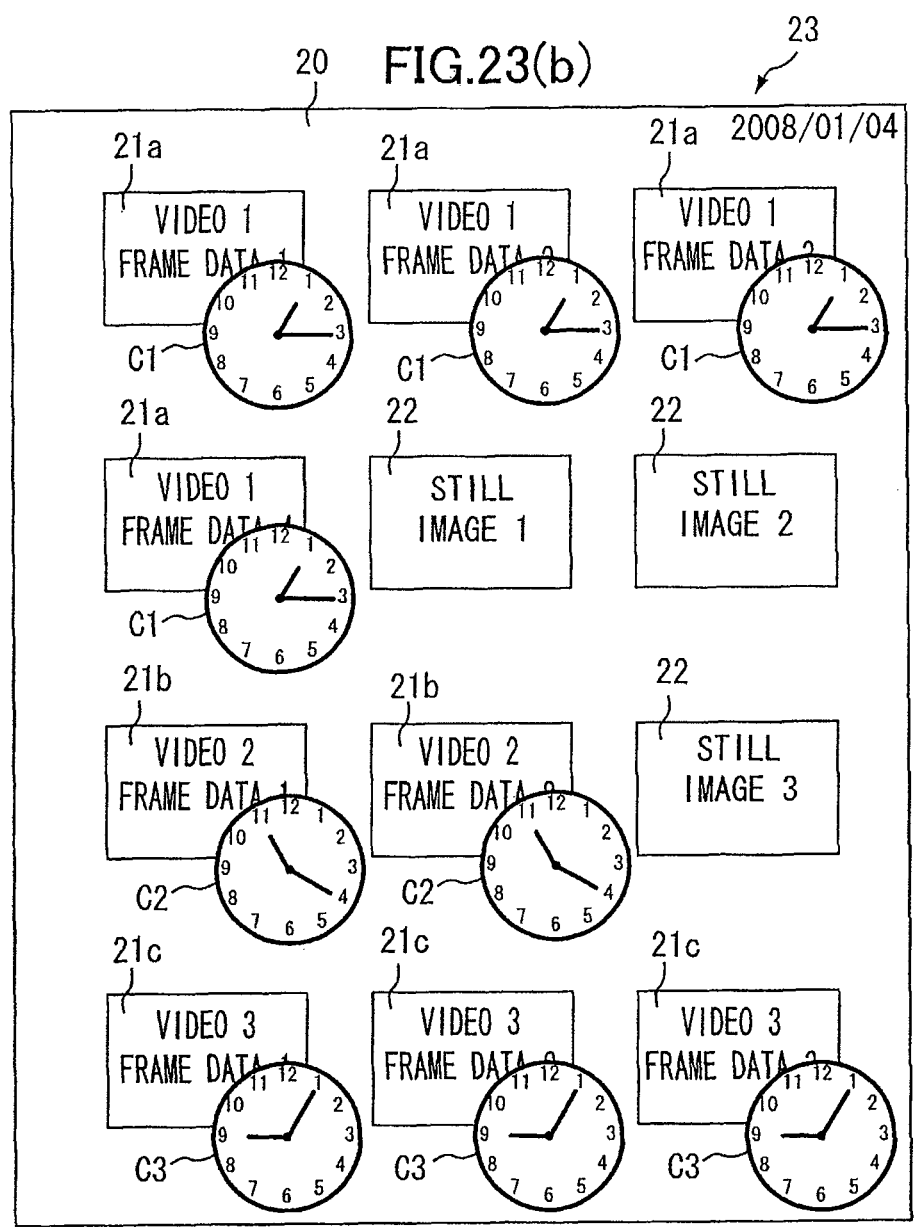

IMAGE PROCESSOR

CROSS REFERENCE TO RELATED APPLICATION

This application claims priorities from Japanese Patent Application No. 2008-094196 filed Mar. 31, 2008 and Japanese Application No. 2008-094224 filed Mar. 31, 2008. The entire contents of the priority applications are incorporated herein by reference.

TECHNICAL FIELD

The disclosure relates to an image processor.

BACKGROUND

Since recent digital cameras are equipped to take both still images and moving images, the user can determine whether to take still photographs or video footage based on the scene being filmed. For example, the user would likely take a still image of a scene with no motion, such as a group photo, and would likely take video of a scene with motion, such as an activity at a sports event.

Devices have also been proposed for selectively printing out still images and video images taken with this type of digital camera (Japanese patent application publications No. 9-322113, for example).

Further, devices have been proposed for printing out or displaying on a display unit an image list with a combination of videos (frame images extracted in units of frames from the videos) and still images taken by the digital camera. For example, Japanese patent application publication No. 2005-130254 describes a print system for displaying videos and still images on a display in a manner that distinguishes the two types of images.

SUMMARY

However, the devices described above cannot simply arrange videos and still images together and are thus less user-friendly for browsing both videos and still images.

According to another aspect, the invention provides an image processor. The image processor is accessible to a storage medium storing at least one set of moving image data each including a plurality of sets of frame image data corresponding to a plurality of frame images. Each set of the at least one set of moving image data corresponds to a moving image. The image processor includes an extracting unit, an assigning unit, and an output unit. The extracting unit extracts at least one set of frame image data from the plurality of sets of frame image data included in one of the at least one set of moving image data. The assigning unit assigns a set of control data to each of the at least one set of frame image data extracted by the extracting unit. The output unit outputs an image list including a moving image index, the moving image index having an index frame image and information with respect to the set of control data, the index frame image being either one of a frame image corresponding to the at least one set of frame image data assigned with the set of control data and a resized frame image resized from the frame image.

According to still another aspect, the invention provides an image processor. The image processor includes an acquiring unit, an extracting unit, an assigning unit, and an output unit. The acquiring unit acquires a plurality of sets of moving image data and at least one set of still image data. Each of the plurality of sets of moving image data includes a plurality of sets of frame image data corresponding to a plurality of frame images. Each of the at least one set of still image data includes a set of still image data corresponding to a still image. The extracting unit extracts sets of frame image data from each of the plurality of sets of moving image data. The assigning unit assigns a set of identifying data to the sets of frame image data extracted by the extracting unit. The set of identifying data identifies sets of frame image data that are included in one set of moving image data. The output unit outputs a set of output data indicating an output image including both an output still image and an output frame images. The output still image corresponds to one of the at least one set of still image data. The output frame images corresponds to the sets of frame image data assigned with the set of identifying data

BRIEF DESCRIPTION OF THE DRAWINGS

Embodiments in accordance with the invention will be described in detail with reference to the following figures wherein:

FIG. 3 shows an example an image list outputted by the MFP;

FIG. 4 conceptually illustrates a structure of a file data storage area;

FIG. 5 conceptually illustrates a structure of a layout data storage area;

FIG. 7 conceptually illustrates a control data storage area;

FIG. 17 shows an example an image list outputted by the MFP according to the second embodiment;

FIG. 18 conceptually illustrates a structure of a file data storage area according to the second embodiment;

FIG. 19 conceptually illustrates a structure of a layout data storage area;

FIG. 21 is a flowchart illustrating a part of steps in a layout order setting process according to the second embodiment;

FIG. 22 is a flowchart illustrating a part of steps in a layout printing process;

FIG. 23(a) shows an example of a clock image according to a modification of the second embodiment; and FIG. 23(b) shows an example of an image list outputted by the MFP according to the modification of the second embodiment.

DETAILED DESCRIPTION

<First Embodiment>

Figure 1:
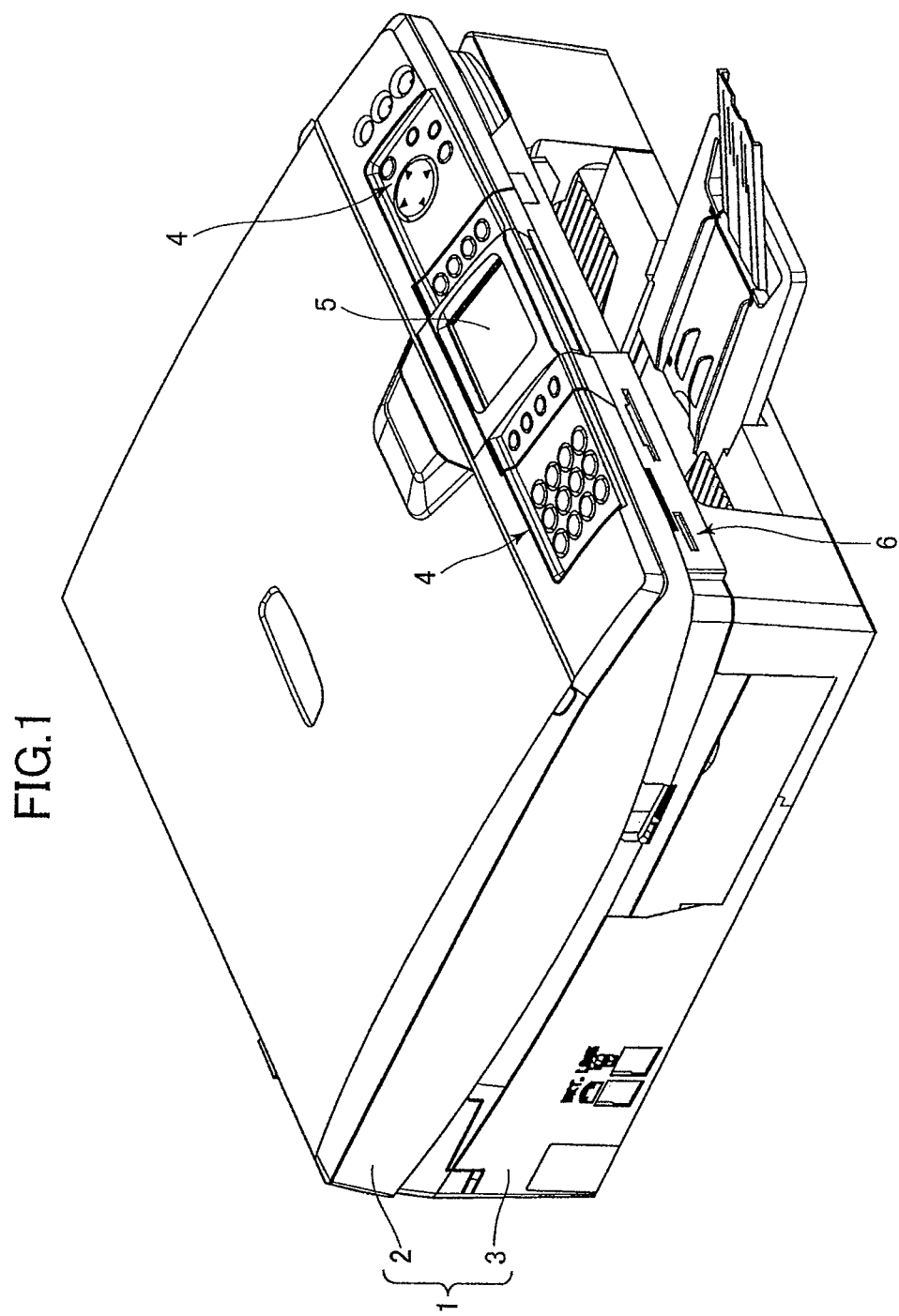
FIG. 1 is a perspective view showing an external structure of a multifunction peripheral (MFP) according to a first embodiment.

Next, a first embodiment of the invention will be described while referring to the accompanying drawings. FIG. 1 is a perspective view showing the external structure of a multifunction peripheral (hereinafter abbreviated as "MFP") 1 as the first embodiment of the image processor according to the present invention.

The MFP 1 is provided with multiple functions, including a photocapture function, a copier function, a scanner function, and a media capture function. Through the media capture function, the MFP 1 can execute processes for reading image files from a media card mounted in a slot section 6 described later and for printing out these image files, for displaying images on an LCD 5 described later corresponding to image files read from the media card, and for saving image files scanned by the scanner function on the media card.

As will be described later, a particular feature of the MFP 1 according to the first embodiment is its ability to output a list of images that can be easily browsed by a user, enabling the user to readily see what image files are stored on the media card mounted in the slot section 6.

The MFP 1 houses a scanner 2 in the upper section thereof for scanning original documents, and an inkjet printer 3 disposed beneath the scanner 2 for printing images on recording paper.

The slot section 6 is provided on the front surface of the MFP 1 and includes multiple card slots in which media cards, such as a CompactFlash (registered trademark) card and an SD card can be directly inserted.

The scanner 2 is a flatbed scanner having a document cover. Just forward of the document cover, the MFP 1 is provided with a control panel including an operating section 4 configured of a plurality of keys and the LCD 5 configured of a touch panel. The MFP 1 displays operating procedures and the status of current processes on the LCD 5 and displays data on the LCD 5 corresponding to operations performed on the operating section 4.

Figure 2:
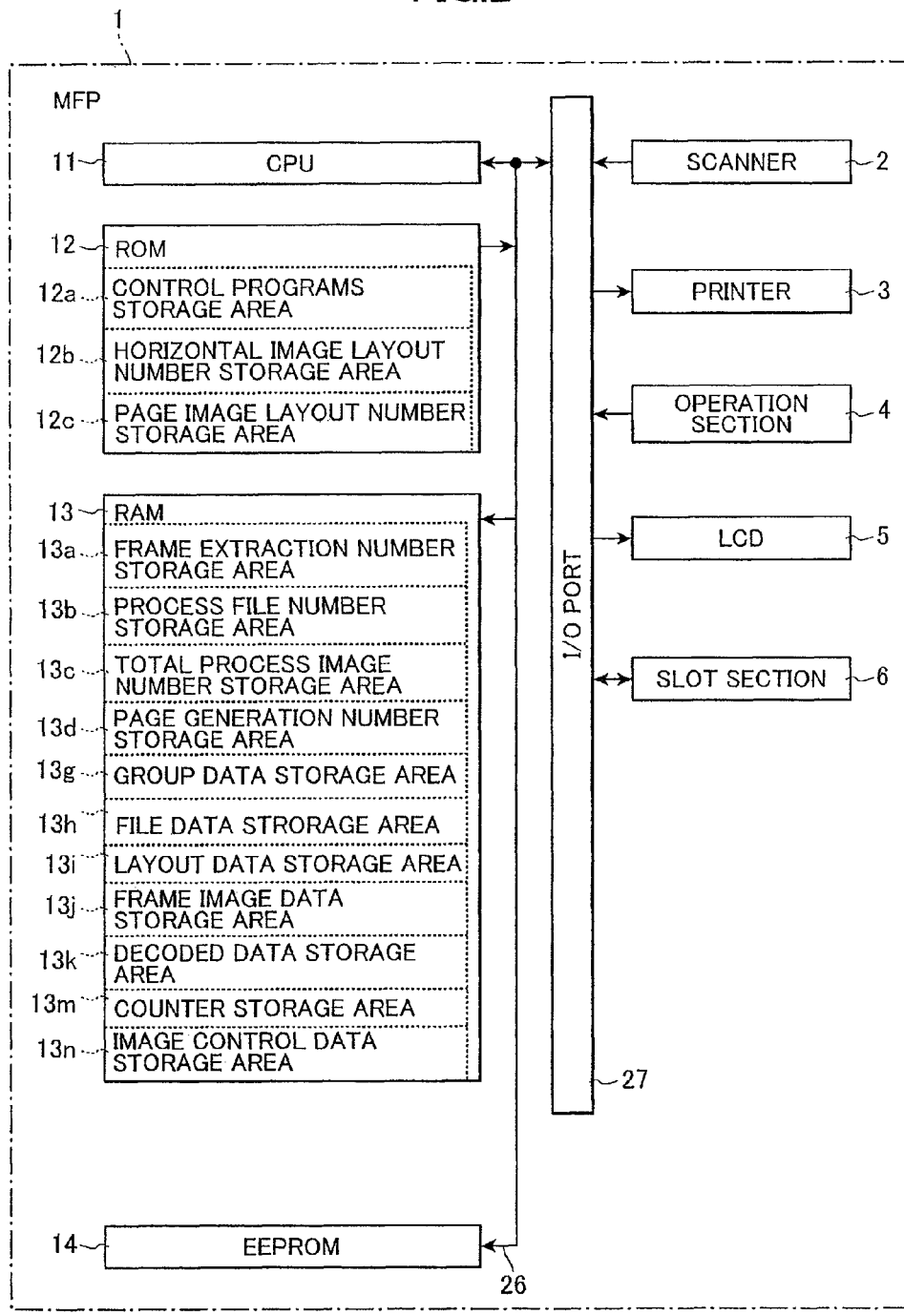
FIG. 2 is a block diagram showing an electrical structure of the MFP.

Next, the electrical structure of the MFP 1 will be described with reference to FIG. 2. FIG. 2 is a block diagram showing the electrical structure of the MFP 1. The MFP 1 primarily includes a CPU 11, a ROM 12, a RAM 13, an EEPROM 14, the scanner 2, the printer 3, the operating section 4, the LCD 5, and the slot section 6.

The CPU 11, ROM 12, RAM 13, and EEPROM 14 are interconnected via a bus line 26. The scanner 2, printer 3, operating section 4, LCD 5, slot section 6, and bus line 26 are also interconnected via an I/O port 27.

The CPU 11 controls the various functions possessed by the MFP 1 and each component connected to the I/O port 27 according to fixed values and programs stored in the ROM 12, RAM 13, and EEPROM 14.

The ROM 12 is a nonvolatile memory capable of preserving stored data even when the power is interrupted.

The ROM 12 is provided with a control program storage area 12a for storing the control programs executed by the CPU 11. The control programs include programs for implementing the processes described later with reference to the flowcharts in FIGS. 8 through 15.

In addition to the control program storage area 12a, the ROM 12 is provided with a horizontal image layout number storage area 12b, and a page image layout number storage area 12c.

The horizontal image layout number storage area 12b is a memory area storing a "horizontal layout number," indicating the number of index images that can be laid out horizontally in a list of images. In the MFP 1 of the first embodiment, the horizontal image layout number storage area 12b stores a plurality of horizontal layout numbers corresponding to predetermined paper sizes (L-size, A4-size, letter size, etc.) and printing modes (fine, normal, draft, etc.). When performing a layout printing process described later with reference to FIG. 13, the MFP 1 reads and employs a suitable value from among the plurality of horizontal layout numbers.

The page image layout number storage area 12c is a memory area storing a "page layout number," indicating the maximum number of index images in an image list that can be arranged on a single sheet of recording paper. The page image layout number storage area 12c in the first embodiment stores a plurality of page layout numbers for predetermined paper sizes and printing modes. In the layout printing process described later with reference to FIG. 13, the MFP 1 reads and employs a suitable value from among these page layout numbers.

The RAM 13 temporarily stores various data produced when the MFP 1 executes various operations. The RAM 13 is provided with a frame extraction number storage area 13a, a process file number storage area 13b, a total process image number storage area 13c, a page generation number storage area 13d, a group data storage area 13g, a file data storage area 13h, a layout data storage area 13i, a frame image data storage area 13j, a decoded data storage area 13k, a counter storage area 13m, and a image control data storage area 13n.

Here, terminology used in the first embodiment will be defined. The term "video" in the first embodiment denotes a moving image reproduced by displaying a plurality of frame images in succession. A "video file" is a file containing data for playing a video, such as an AVI video file or a QuickTime video file. The video file may be of any format, provided that the file contains data that can be used to playback video images. Further, "frame image data" in the first embodiment denotes data corresponding to a single frame image of a video.

The frame extraction number storage area 13a is a memory area storing a "frame image extraction number," denoting the number of frame images for which corresponding frame image data is to be extracted per video file. If the frame image extraction number is "5", for example, the MFP 1 extracts frame image data for five frames per video file and lays out five index images per video file in an image list based on the extracted frame image data.

In the first embodiment, the MFP 1 stores an arbitrary value inputted by the user via the operating section 4 in the frame extraction number storage area 13a as the frame image extraction number. However, the frame image extraction number may also be stored in the ROM 12.

The process file number storage area 13b is a memory area storing a "total number of process files," denoting the total number of still image files and video files stored on the media card.

The total process image number storage area 13c is a memory area storing a "total number of process images," indicating the total number of index images to form in the image list. The page generation number storage area 13d is a memory area storing a "page generation number," denoting the total number of pages of the image list to output when executing the layout printing process described later with reference to FIG. 13.

The group data storage area 13g, a file data storage area 13h, and a layout data storage area 13i are described later with reference to FIGS. 4-6.

The frame image data storage area 13j is a memory area storing frame image data extracted from a video file. The decoded data storage area 13k is a memory area storing the results of a process to decode frame image data or the results of a process to decode a still image file.

The counter storage area 13m is a memory area storing various counter values. The EEPROM 14 is a nonvolatile writable memory. The image control data storage area 13n is described later with reference to FIG. 7.

FIG. 3 shows an example of an image list 20 outputted by the MFP 1. As shown in FIG. 3, video index images 21 and still image index images 22 are laid out in the image list 20.

First, video index images 21 for playing back videos will be described. When video files are stored on a memory card, the MFP 1 extracts frame image data corresponding to frame images in the video for each video file stored on the media card.

The MFP 1 assigns a control number 212 for each item of frame image data extracted from the video files. The MFP 1 generates a video index image 21 for each extracted item of frame image data, lays out the video index images 21 in the image list 20, and outputs the image list 20. Here, the video index image 21 includes a thumbnail 211 formed by enlarging or reducing the frame image corresponding to the extracted frame image data to a prescribed size, and the control number 212 assigned to the frame image data.

The user can specify a desired frame image in the image list 20 using the control numbers 212, thereby enhancing user-friendliness of the image list 20.

Next, the still image index images 22 for outputting still images will be described. The MFP 1 also assigns a control number 222 to each still image file when still image files are stored on the media card together with video files. The MFP 1 generates a still image index image 22 for each still image file stored on the media card. The MFP 1 lays out the still image index images 22 in the image list 20 together with the video index images 21, and outputs the image list 20. Each still image index image 22 has a thumbnail 221 formed by enlarging or reducing the still image corresponding to the still image file to a prescribed size, and the control number 222 assigned to the still image file.

Thus, the user can browse the combined group of video index images 21 and still image index images 22, enhancing user-friendliness of the image list 20. Since a control number is included in each of the index images 21 and 22, the user can easily specify a desired image in the image list 20, even though the image list 20 includes a combination of frame images and still images.

For simplification, reference numbers are noted only for one video index image 21 and one still image index image 22 in FIG. 3.

The MFP 1 is also configured to output an image list 20 for each group in which the images are sorted based on a capture date condition. In the example of FIG. 3, two image lists 20 are formed for groups of images with the capture dates 1-15-2008 and 1-20-2008.

The MFP 1 prints a capture date 23 for each group and a group number 24 identifying each group in the header section of the corresponding image list 20.

Hence, if the user knows the capture date of a desired image, the user can view an image list 20 having only images with this capture date in order to find the desired image more easily.

The MFP 1 sets the layout order of the index images 21 and 22 so that one row of index images 21 and 22 having the earliest capture dates and times is arranged from left to right in the image list 20, and thereafter a row of index images 21 and 22 having the next earliest capture dates and times is arranged below the previous row. That is, the index images 21 and 22 are arranged in the ascending order from left-to-right and up-to-down. Hence, the user can quickly find a desired image from among the index images 21 and 22.

The MFP 1 according to the embodiment is configured to extract frame image data corresponding to at least one frame image from each video file and to output video index images 21 for this frame image data. However, the MFP 1 may also be configured to extract frame image data corresponding to a plurality of frame images per video file and to output the corresponding video index images 21. By viewing the plurality of frame images for each video file in the image list 20, the user can visualize temporal changes among images recorded in the video file.

As shown in the example of FIG. 3, the MFP 1 can also print out video index images 21 taken from the same video file with borders resembling a movie filmstrip. In this way, the user can distinguish video index images 21 from still image index images 22.

FIG. 4 conceptually illustrates the structure of the file data storage area 13h. As shown in FIG. 4, the file data storage area 13h includes a file ID storage area 201 storing file IDs, a file name storage area 202 storing filenames, a file type storage area 203 storing file types, a frame extraction number storage area 204 storing frame image extraction numbers, a total frame number storage area 205 storing total frame numbers, an fps data storage area 206 storing frames per second data, a file date data storage area 207 storing file date data, and a file time data storage area 208 storing file time data. File data records 200 are each configured of a filename, file type, frame extraction number, fps data, file date data, and file time data. The file data records 200 are stored in association with file IDs for managing the file data records 200. That is, the file data 200 corresponds to each line of the file data storage area 13h shown in FIG. 4. The MFP 1 creates a file data record 200 for each still image file and video file stored on the media card and stores the file data record 200 in the file data storage area 13h as a preparatory process for determining the layout order of the index images 21, 22 in the image list 20 (see FIG. 3).

The file ID storage area 201 is an address area storing a file ID, and the file name storage area 202 is a memory area storing the filename of a still image file or a video file. As shown in FIG. 4, an extension is appended to each filename. Examples of extensions appended to filenames are "jpg" for JPEG image files, "avi" for AVI video files, and "mov" for QuickTime video files.

The file type storage area 203 is a memory area storing a value that indicates the type (format) of image file. The type of the image file can be determined from the extension appended to the filename, for example. In the first embodiment, the value "0" is stored in the file type storage area 203 when the image file is in the JPEG file format (jpg extension), the value "1" is stored in the file type storage area 203 when the image file is in the AVI video file format (avi extension), and the value "2" is stored in the file type storage area 203 when the image file is in the QuickTime video file format (mov extension).

The MFP 1 can determine the type of image file based on data stored in a few bytes at the beginning of the image file. For example, if the first two bytes at the start of an image file are "0xFFD8," the MFP 1 can detect that the file is a JPEG file. If the first two bytes are "0x424D," the MFP 1 can detect that the file contains bitmap data. Hence, it is possible to determine the type of image file based on this data.

The frame extraction number storage area 204 stores a value indicating the number of frame images for which corresponding frame image data is to be extracted from the image file. A "1" is stored in the frame extraction number storage area 204 when the file is a still image file. A number greater than "1" is stored in the frame extraction number storage area 204 when the file is a video image file.

The total frame number storage area 205 stores the total number of frames in the corresponding image file. Hence, when the file is a video file, the total frame number storage area 205 stores the total number of frames in that video file. If the file is a still image file, then the total frame number storage area 205 always stores the value "1".

The fps data storage area 206 stores fps (frames per second) data for the image file. In the case of a video file, the fps data storage area 206 stores a value such as "60" or "30" indicating that the video is played at a rate of 60 frames per second or 30 frame per second, respectively. A "0" is stored in the fps data storage area 206 when the file is a still image file.

The file date data storage area 207 stores file date data representing the date that the image file was captured; for example, the capture date "Jan. 15, 2008" is represented with the file date data "20080115."

The file time data storage area 208 stores file time data indicating the time that the image file was captured; for example, the capture time "12:50:45," where "12" indicates the hour, "50" the minutes, and "45" the seconds, is expressed with the file time data "125045." If the image file is a video file, data indicating the start time for video capture is stored as the file time data.

In the following description, it will be assumed that the total frame number, fps data, file date data, and file time data are acquired by extracting data from the header of the image file, but this data may be acquired by other means.

The MFP 1 of the embodiment sets the layout order of the index images 21 and 22 to an order corresponding to the capture date and time based on unique data for each image file stored in the file data storage area 13h. Data indicating this layout order is stored in the layout data storage area 13i shown in FIG. 5.

FIG. 5 conceptually illustrates the structure of the layout data storage area 13i. As shown in FIG. 5, the layout data storage area 13i stores layout data records 300, each including a file ID, a group number, frame extraction position, image date data, and image time data; and a layout order number associated with each layout data record 300.

Specifically, the layout data storage area 13i is provided with a layout order storage area 301, a file ID storage area 302, a group number storage area 303, a frame extraction ordinal number storage area 304, an image date data storage area 305, and an image time data storage area 306.

The layout order storage area 301 stores layout order numbers. In the layout printing process described later with reference to FIG. 13, the MFP 1 reads layout data records 300 in an order based on these layout order numbers and arranges index images 21, 22 in the image list 20 for frame images and still images identified by the layout data records 300 based on this layout order.

The file ID storage area 302 stores file IDs. Since a file ID is stored for each filename in the file data storage area 13h, as described above with reference to FIG. 4, each image file can be identified from the file ID.

The group number storage area 303 stores group numbers Group nos. will be described later with reference to FIG. 6.

The frame extraction ordinal number storage area 304 stores a "frame extraction ordinal number" designating the place of the frame image from a first frame of one video file.

The frame extraction ordinal number can be calculated according to the following equation using the total number of frames in the video file stored in the total frame number storage area 205, the number of frames to be extracted stored in the frame extraction number storage area 204, and the frame extraction number counter indicating the ordinal number of the frame image being extracted from the video.

$$(\text{Frame extraction ordinal number}) = [(\text{frame extraction number counter} - 1) \times (\text{total frame number}) \div (\text{frame extraction number})]$$

Here, "[ ]" represents the Gaussian symbol, where [a] indicates the maximum integer not greater than a. A frame extraction counter used in a layout order setting process described below is equivalent to (frame extraction number counter −1).

The image date data storage area 305 stores image date data expressing the day that the image file identified by the file ID stored in the file ID storage area 302 was captured. The image time data storage area 306 stores the image time data representing the time that the file was captured. For still image files, the file time data stored in the corresponding memory area of the file data storage area 13h is copied to this image time data storage area 306.

On the other hand, since a plurality of items of frame image data is extracted from a video file, the MFP 1 acquires image time data expressing the capture time of each frame image and stores these capture times in the image time data storage area 306. Specific examples for calculating the image time data for each frame image data will be described later with reference to the flowchart in FIG. 9.

In the layout printing process described later with reference to FIG. 13, the MFP 1 prints the image list 20 (see FIG. 3) having index images 21, 22 arranged in order of the capture date and time based on the layout data records 300 stored in the layout data storage area 13i.

Figure 6:
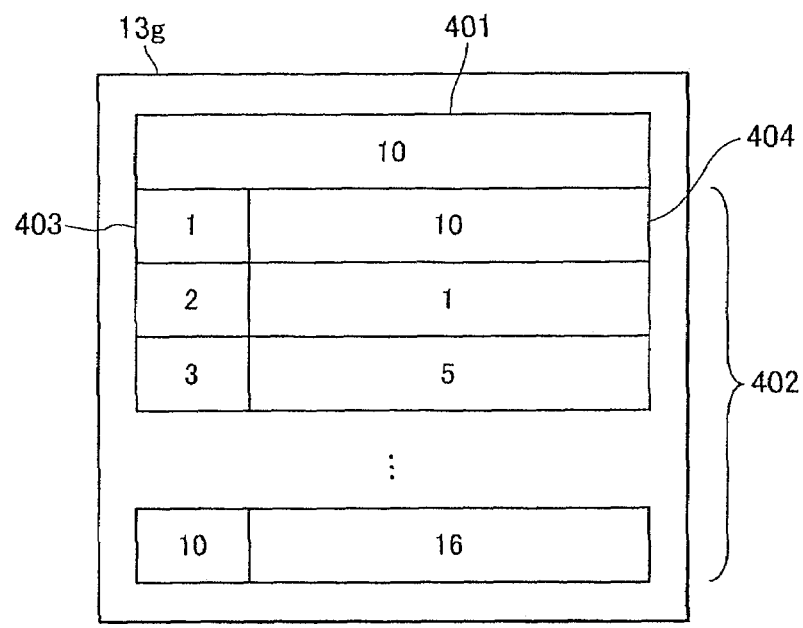
FIG. 6 conceptually illustrates a group data storage area.

FIG. 6 shows a sample configuration of the group data storage area 13g. As shown in FIG. 6, the group data storage area 13g is provided with a total group number storage area 401, and a unit group data storage area 402.

The total group number storage area 401 stores the number of groups generated in order to sort the index images 21 and 22. In the example shown in FIG. 6, ten groups have been generated to sort the index images 21 and 22.

The unit group data storage area 402 stores data for each group. The unit group data storage area 402 includes a group number storage area 403 and a group image number storage area 404. The group number storage area 403 is for storing a group number (ordinal number). The group image number storage area 404 is for storing the number of index images 21 and 22 sorted in the group identified by the group number. In the example shown in FIG. 6, ten index images 21 and 22 have been sorted into the group with group number "1".

The MFP 1 according to the embodiment outputs an image list 20 for each group based on data stored in the group data storage area 13g.

FIG. 7 conceptually illustrates the content of the image control data storage area 13n. The image control data storage area 13n stores control numbers assigned to each item of frame image data and each still image file. As shown in FIG. 7, the image control data storage area 13n includes a group number storage area 501 storing group ordinal numbers, an image control number storage area 502 storing control numbers (see FIG. 3) assigned to each item of frame image data and still image file, a file ID storage area 503 storing file IDs, and a frame ordinal number storage area 504 storing frame ordinal numbers that designate a frame image among all frame images to be extracted from a single video file.

As shown in FIG. 7, the MFP 1 according to the embodiment assigns a unique control number to each item of frame image data and each still image file classified in the same group. That is each of the control numbers has different value from each other within the group. As described with reference to FIG. 3, index images 21 and 22 in the same group are outputted together in a single image list 20. However, since each video index image 21 and still image index image 22 is assigned a unique control number within the group, the user can uniquely identify the index images 21 and 22 arranged in the same image list 20 (i.e., the index images 21 and 22 within the same group) based on the control numbers.

Figure 8:
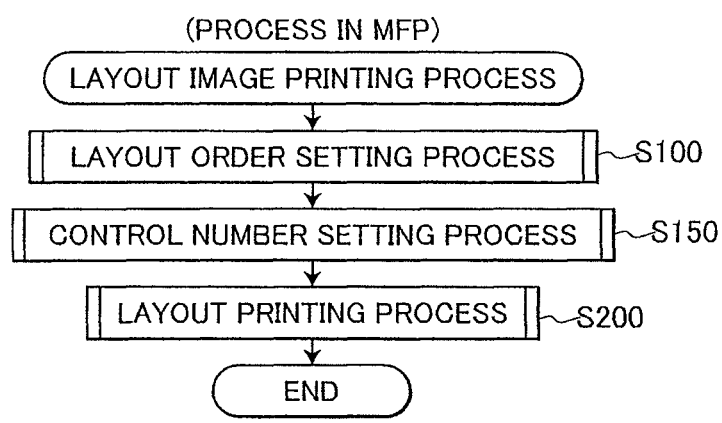
FIG. 8 is a flowchart illustrating steps in a layout image printing process executed on the MFP according to the first embodiment.

FIG. 8 is a flowchart illustrating steps in a layout image printing process executed on the MFP 1. The MFP 1 executes the layout image printing process when the user inputs a command to output an image list.

In $S_{100}$ at the beginning of the layout image printing process, the CPU 11 of the MFP 1 executes a layout order setting process for setting the layout order of the index images 21 and 22. In $S_{150}$ the CPU 11 executes a control number setting process for setting the control numbers included in the index images 21 and 22. In $S_{200}$ the CPU 11 executes a layout printing process for outputting the image list 20 described with reference to FIG. 3 based on the layout order and control numbers set in $S_{100}$ and $S_{150}$. Next, each process will be described in greater detail.

Figure 9:
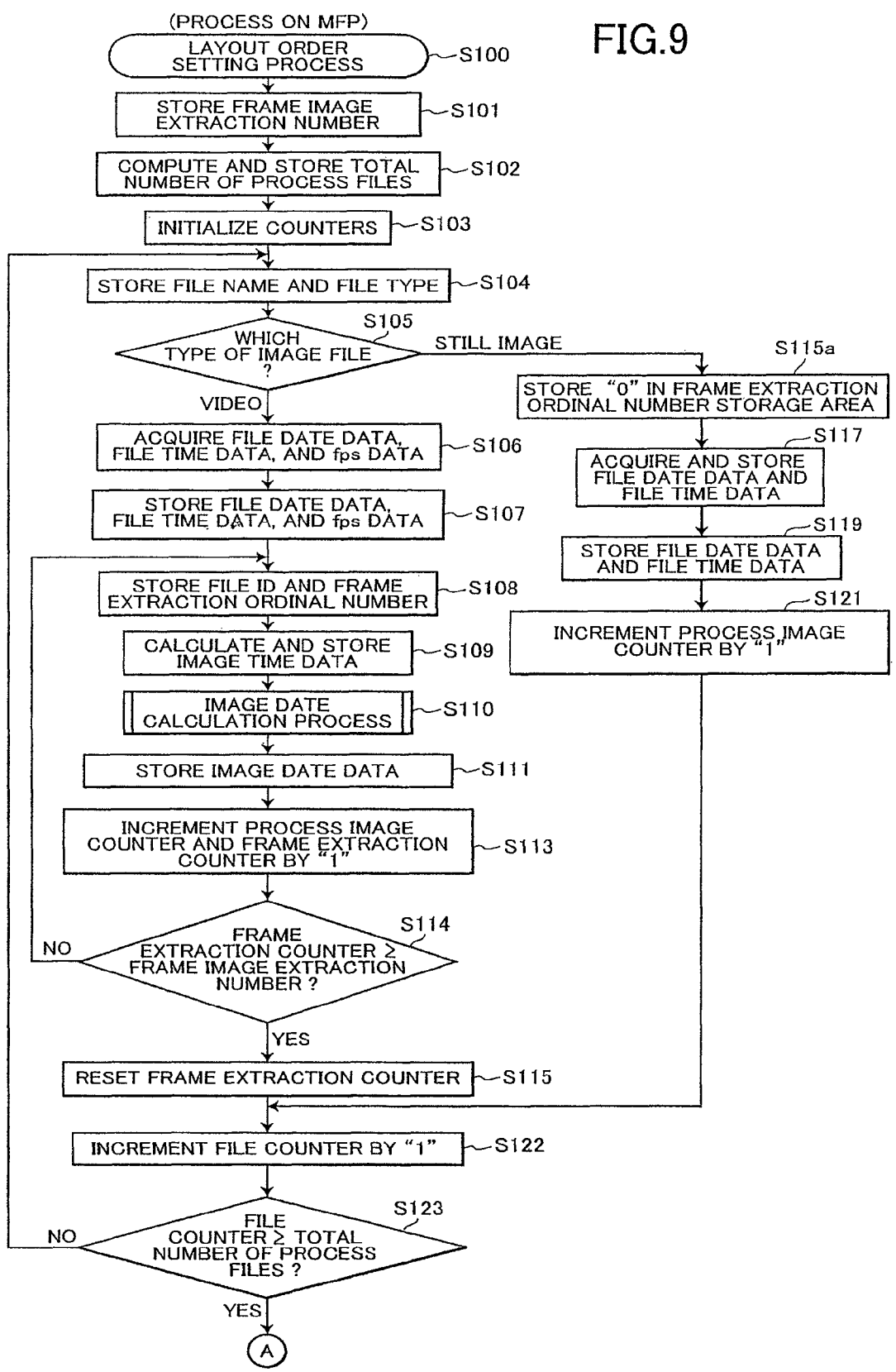
FIG. 9 is a flowchart illustrating a part of steps in a layout order setting process.

FIG. 9 is a flowchart illustrating steps in the layout order setting process of S100. In S101 at the beginning of this process, the CPU 11 stores a value inputted by the user via the operating section 4 in the frame extraction number storage area 13a as the frame image extraction number. In S102 the CPU 11 acquires a number of video files and a number of still image files. The CPU 11 calculates the total number of process files including still image files and video files stored on the media card and stores this number in the process file number storage area 13b.

In S103 the CPU 11 initializes a file counter, a process image counter, and a frame extraction counter to "0". These counters are stored in the counter storage area 13m shown in FIG. 2.

Next, in S104 the CPU 11 selects one image file from among the files stored on the media card and acquires the filename and file type of the image file. Further, in S104 the CPU 11 stores the acquired filename and file type in the respective file name storage area 202 and file type storage area 203 shown in FIG. 4 in association with the file ID equivalent to the file counter.

In S105 the CPU 11 determines whether the selected image file is a video file or a still image file. If the CPU 11 determines that the file is a video file (S105: video), then in S106 the CPU 11 extracts the file date data, file time data, and fps data for the video file from the header.

In S107 the CPU 11 stores the acquired file date data, file time data, and fps data in the respective file date data storage area 207, the file time data storage area 208, and the fps data storage area 206 associated with the layout order number equivalent to the process image counter.

In S108 the CPU 11 stores the value of the file counter at the current time in the file ID storage area 302 of the layout data storage area 13i shown in FIG. 5 in association with the layout order number equivalent to the process image counter. Further, the CPU 11 calculates the frame extraction ordinal number based on the frame extraction counter at the current point, and stores the calculated frame extraction ordinal number in the frame extraction ordinal number storage area 304 in association with the layout order number equivalent to the process image counter.

In S109 the CPU 11 calculates time data for the frame image data and stores this time data in the image time data storage area 306 in association with the layout order number as image time data. Specifically, the image time data is calculated according to the following equations, where VideoTime is the file time data representing the capture start time of the video file, FPS is the frames per second data, FrameTime is the image time data representing the capture time of the frame image data, and N is the frame extraction ordinal number identifying the targeted frame image data.

Using the following equations, the file time data VideoTime is divided into video hour data VT_Hour, video minute data VT_Minute, and video second data VT_Second.

$VT\_Hour=[VideoTime/10000]$ $VT\_Minute=[(VideoTime-VT\_Hour\times10000)/100]$ $VT\_Second=VideoTime-VT\_Hour\times10000+VT\_Minute\times100)$ Next, frame hour data Frame_Hour, frame minute data Frame_Minute, and frame second data Frame_Second are calculated using Equations 1-1 below, where Cal_Second, Cal_Minute, and Cal_Hour are temporary variables for achieving these calculations, and A mod B represents the remainder after dividing A by B.

$Cal\_Second=VT\_Second+[N/FPS]$ $Cal\_Minute=VT\_Minute+[Cal\_Second/60]$ $Cal\_Hour=VT\_Hour+[Cal\_Minute/60]$ $Frame\_second=Cal\_Second \bmod 60$ $Frame\_Minute=Cal\_Minute \bmod 60$ $Frame\_Hour=Cal\_Hour \bmod 24$ (Equations 1-1)

The image time data FrameTime indicating the capture time of the frame image data can then be calculated by substituting the above results into Equation 1-2 below.

$FrameTime=Frame\_Hour\times10000+Frame\_Minute\times100+Frame\_Second$ (Equations 1-2)

In the same way, Equations 1-3 below are used to break down a value VideoDate into video year data VD_Year, video month data VD_Month, and video day data VC_Day, where VideoDate is the file date data for the video file and FrameDate is the image date data for the extracted frame image data.

$VD\_Year=[VideoDate/10000]$ $VD\_Month=[(VideoDate—VD\_Year\times1000)/100]$ $VD\_Day\ VideoDate-(VD\_Year\times10000+VD\_Month\times100)$ (Equations 1-3)

Next, the CPU 11 executes an image date calculation process in S110. This process is performed to calculate frame year data Frame_Year, frame month data Frame_Month, and frame day data Frame_Day.

Figure 10:
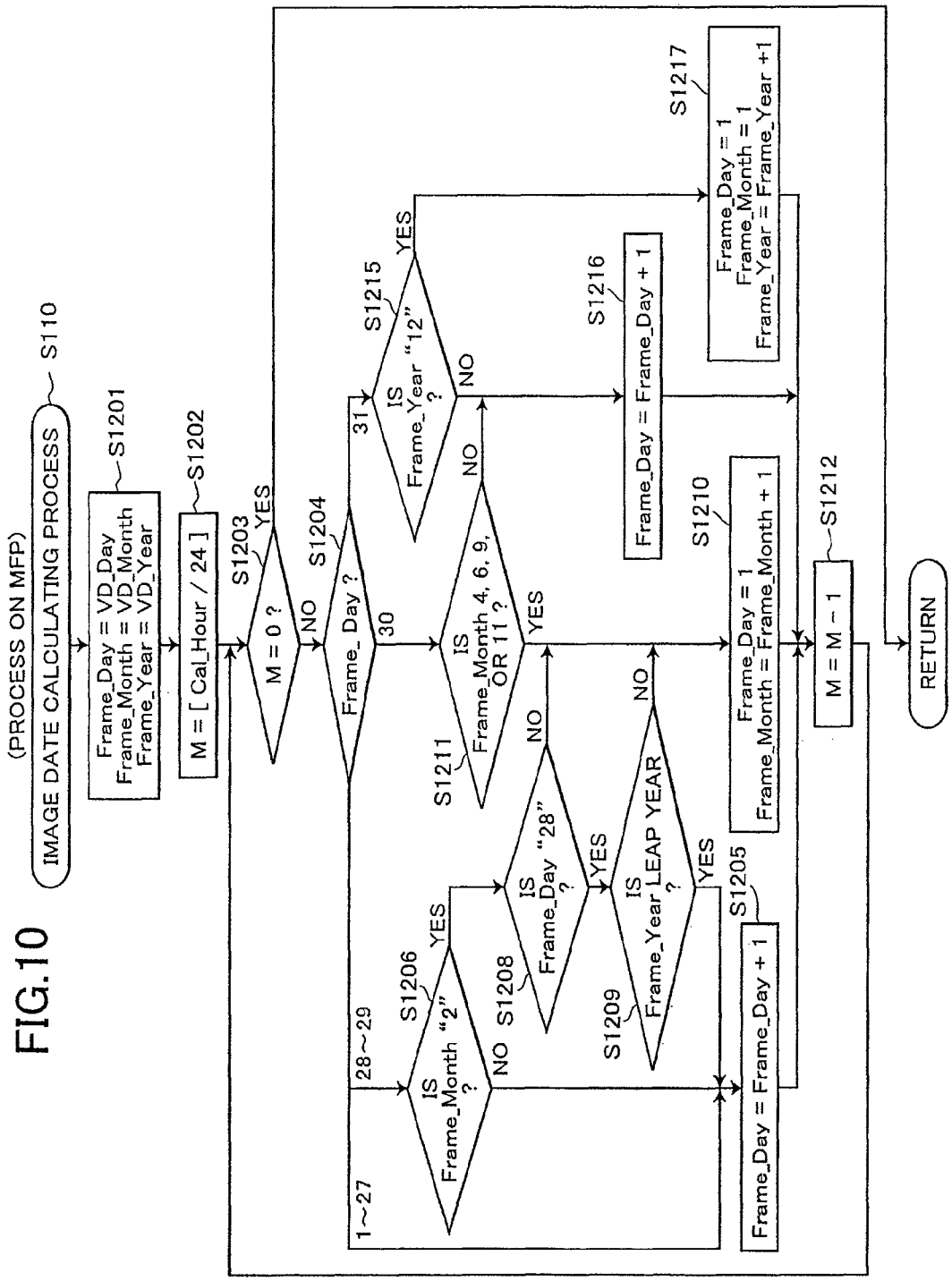
FIG. 10 is a flowchart illustrating steps in an image date calculation process.

FIG. 10 is a flowchart illustrating steps in the image date calculation process of S110. In the flowchart of FIG. 10, a variable M denotes the number of days prior to the capture time of the frame image data. That is, the variable M denotes the number of days between the capture start time of the video file and the capture time of the frame image data.

In S1201 of the image date calculation process, the CPU 11 sets the frame year data Frame_Year, the frame month data Frame_Month, and the frame day data Frame_Day to video year data VD_Year, video month data VD_Month, and video day data VD_Day, respectively. In S1202 the CPU 11 sets the variable M to the value Cal_Hour/24. In S1203 the CPU 11 determines whether M is "0." If M is "0" (S1203: YES), the CPU 11 ends the current process.

However, if M is not "0" (S1203: NO), in S1204 the CPU 11 determines the frame day data Frame_Day. If the frame day data Frame_Day is between "1" and "27" (S1204: 1-27), in S1205 the CPU 11 increments Frame_Day by "1".

However, if the CPU 11 determines in S1204 that the frame day data Frame_Day is "28" or "29" (S1204: 28 or 29), in S1206 the CPU 11 determines whether the frame month data Frame_Month is "2". If Frame_Month is not "2" (S1206: NO), the CPU 11 advances to S1205.

However, if Frame_Month is "2" (S1206: YES), in S1208 the CPU 11 determines whether the frame day data Frame_Day is "28". If Frame_Day is not "28" (S1208: NO), then in S1210 the CPU 11 sets Frame_Day to "1" and increments Frame_Month by "1".

However, if the CPU 11 determines in S1208 that Frame_Day is "28" (S1208: YES), in S1209 the CPU 11 determines whether the year indicated by the frame year data Frame_Year is a leap year. The CPU 11 advances to S1205 if the data indicates a leap year (S1209: YES) and advances to S1210 if the data does not indicate a leap year (S1209: NO).

If the CPU 11 determines in S1204 that Frame_Day is "30" (S1204: 30), in S1211 the CPU 11 determines whether Frame_Month is one of "4", "6", "9", or "11". If so (S1211: YES), the CPU 11 advances to S1210.

However, if Frame_Month is not one of "4", "6", "9", or "11" (S1211: NO), in S1216 the CPU 11 increments Frame_Day by "1". Further, if the CPU 11 determines in S1204 that Frame_Day is "31" (S1204: 31), in S1215 the CPU 11 determines whether Frame_Year is "12". If not (S1215: NO), the CPU 11 advances to S1216 described above.

However, if Frame_Year is "12" (S1215: YES), in S1217 the CPU 11 sets Frame_Day to "1", sets Frame_Month to "1", and increments Frame_Year by "1".

After performing any of the processes in S1205, S1210, S1216, and S1217, in S1212 the CPU 11 decrements the variable M by "1" and returns to S1203. When the CPU 11 determines in S1203 that M is "0" (S1203: YES), the CPU 11 ends the image date calculation process.

Returning to FIG. 9, in S111 the CPU 11 substitutes the value found in the process of FIG. 10 in Equation 1-5 below, for example, to find image date data FrameDate representing the capture date of the frame image data. Further in S111 the CPU 11 stores this calculated image date data FrameDate in the image date data storage area 305 in association with the layout order number equivalent to the process image counter.

$$\text{FrameDate} = \text{Frame\_Year} \times 10000 + \text{Frame\_Month} \times 100 + \text{Frame\_Day} \quad \text{(Equation 1-5)}$$

In S113 the CPU 11 increments each of the process image counter and the frame extraction counter in the counter storage area 13m by "1".

In S114 the CPU 11 determines whether the value of the frame extraction counter is greater than or equal to the frame image extraction number that denotes the number of frame images for which corresponding frame image data is to be extracted per video file and that is stored in the frame extraction number storage area 13a. If not (S114: NO), the CPU 11 returns to S108 and repeats the process described above.

However, if the frame extraction counter is greater than or equal to the frame image extraction number (S114: YES), then in S115 the CPU 11 resets the frame extraction counter to "0" and in S112 increments the process image counter by "1". In S123 the CPU 11 determines whether the process image counter is greater than or equal to "the total number of process files" indicating the total number of still image files and video image files stored in the media card. If not (S123: NO), the CPU 11 returns to S104, selects the next image file and repeats the process described above.

Next, the process performed by the CPU 11 when the CPU 11 determines that the targeted image file is a still image file (S105: still image) will be described. In the case of a still image file as well, the CPU 11 stores the current value of the process image counter in the file ID storage area 302. In S115a the CPU 11 stores a "0" in the frame extraction ordinal number storage area 304 in association with the layout order number equivalent to the process image counter.

In S117 the CPU 11 acquires the file date data and the file time data for the targeted still image file. Further, in S17 the CPU 11 stores the file date data and the file time data respectively in the file date data storage area 207 and the file time data storage area 208 (see FIG. 4) corresponding to the file ID equivalent to the process image counter. The CPU 11 stores "0" in the fps data storage area 206.

In S119 the CPU 11 stores the file date data and the file time data for the targeted still image file in the image date data storage area 305 and the image time data storage area 306 shown in FIG. 5 in association with the layout order number equivalent to the process image counter. In S121 the CPU 11 increments the process image counter by "1" and advances to S122.

Hence, after completing; the process in S101 through S123, the layout data storage area 13i stores a file ID, a frame extraction ordinal number, image date data, and image time data for the current still image file.

Figure 11:
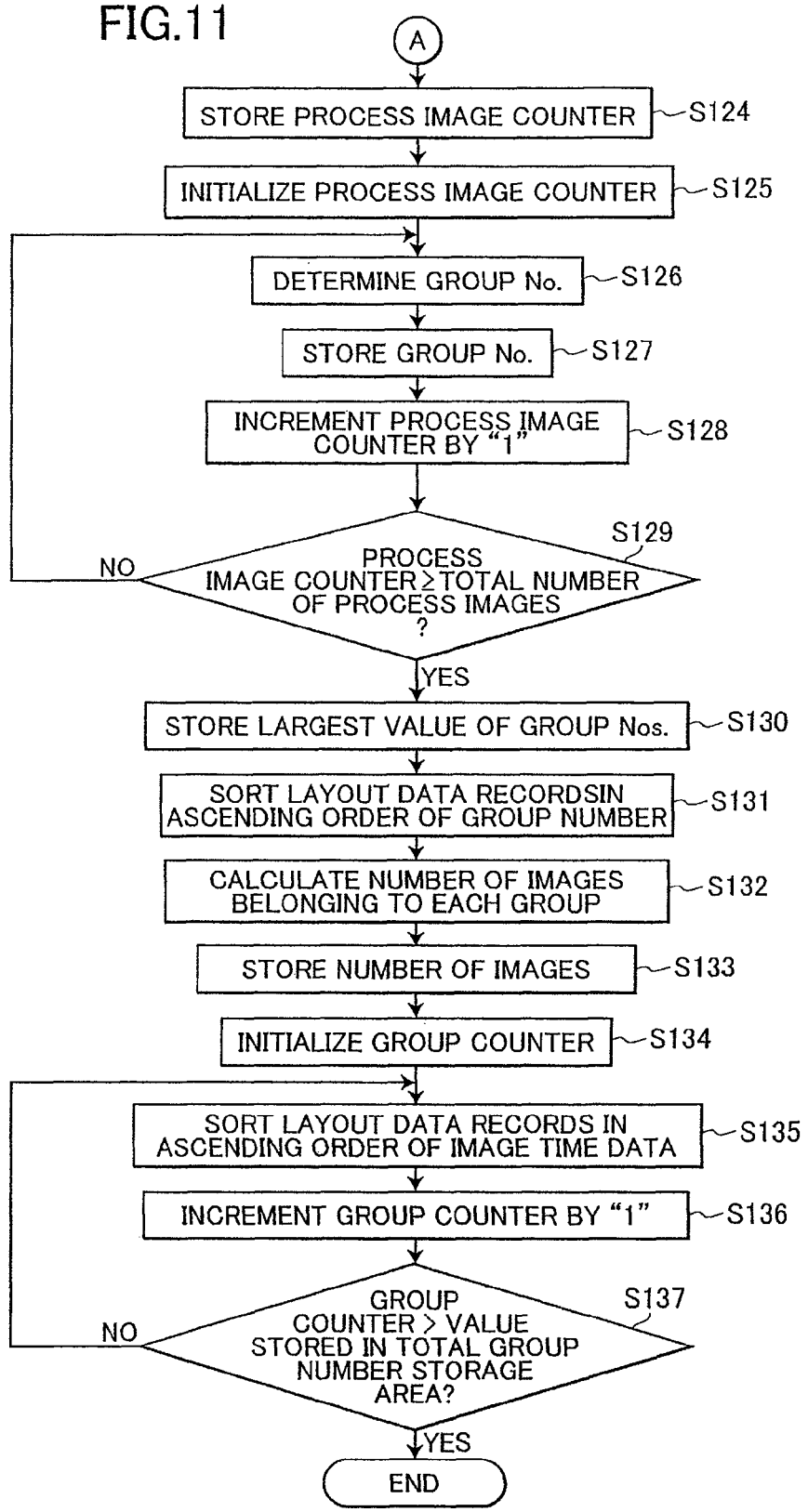
FIG. 11 is a flowchart illustrating a remaining part of steps in the layout order setting process of FIG. 9.

FIG. 11 is a flowchart illustrating steps in a continuation of the layout order setting process shown in FIG. 9. The process in FIG. 11 is performed to sort the index images 21 and 22 to be laid out in the image list 20 based on the image date data and sorts layout data stored in the layout data storage area 13i (see FIG. 5) according to a layout order based on the capture date and time.

In S124 of FIG. 11, the CPU 11 stores the current value of the process image counter in the total process image number storage area 13c shown in FIG. 2 as the total number of process images. In S125 the CPU 11 resets the process image counter to "0". The process image counter is stored in the counter storage area 13m shown in FIG. 2.

In S126 the CPU 11 sets the group number based on the image date data stored in the image date data storage area 305 of the layout data storage area 13i shown in FIG. 5. Specifically, if the value in the image date data storage area 305 associated with the layout order number equivalent to the process image counter is the same as the value for a group already existing in the table, the CPU 11 sets the group number for this image data to the same group number. If not, the CPU 11 sets the group number for the current image data to a new group number. Here, the initial group number is "1" and a new group number is set to "1" plus the largest group number thus far.

In this way, index images 21 and 22 corresponding to frame image data or still image files having the same capture date are sorted into the same group, while index images 21 and 22 corresponding to frame image data or still image files having different capture dates are sorted into different groups.

In S127 the CPU 11 stores the group number set in S126 in the group number storage area 303 shown in FIG. 5 in association with the layout order number equivalent to the process image counter. In S128 the CPU 11 increments the process image counter by "1" and in S129 determines whether the value of the process image counter is greater than or equal to the value stored in the total process image number storage area 13c. If not (S129: NO), the CPU 11 repeats the process from S126.

However, if the value of the process image counter is greater than or equal to the total number of process images (S129: YES), in S130 the CPU 11 stores the largest group number in the total group number storage area 401 shown in FIG. 6. In S131 the CPU 11 sorts the layout data records in order from smallest group number. Sorting layout data in order of smallest group number can be accomplished with the quicksort or bubble sort algorithm, but the invention is not particularly restricted to any sorting algorithm.

FIG. 5 conceptually illustrates the layout data storage area 13i when the layout data stored in the layout data storage area 13i has been sorted in order from smallest group number.

Returning to FIG. 11, in S132 the CPU 11 calculates the number of images having the same group number and in S133 stores this value in the group image number storage area 404 in association with the group number. In S134 the CPU 11 initializes a group counter to "1". The group counter is stored in the counter storage area 13m shown in FIG. 2.

In S135 the CPU 11 sorts the layout data records 300 in order of smallest image time data. The layout data records 300 are sorted separately for each group corresponding to the current value of the group counter. Consequently, the corresponding layout order numbers are set for each index images 21 and 22 identified by the layout data record 300. In other words, the CPU 11 sets the layout order based on the image time data (capture time data) among index images classified in the same group.

Since it is preferable not to change the original layout order for images having the same image time data, a simple sorting algorithm, such as the bubble sort, is preferably used in S135.

In S136 the CPU 11 increments the group counter by "1" and in S137 determines whether the value of the group counter is greater than the value stored in the total group number storage area 401 shown in FIG. 6. If not (S137: NO), the CPU 11 returns to S135 and repeats the process described above. When the CPU 11 determines that the group counter is greater than the value stored in the total group number storage area 401 (S137: YES), then the process has been completed for all groups and the CPU 11 ends the layout order setting process of S100.

Next, the control number setting process for assigning a control number to each of the items of frame image data and each of the still image files will be described.

Figure 12:
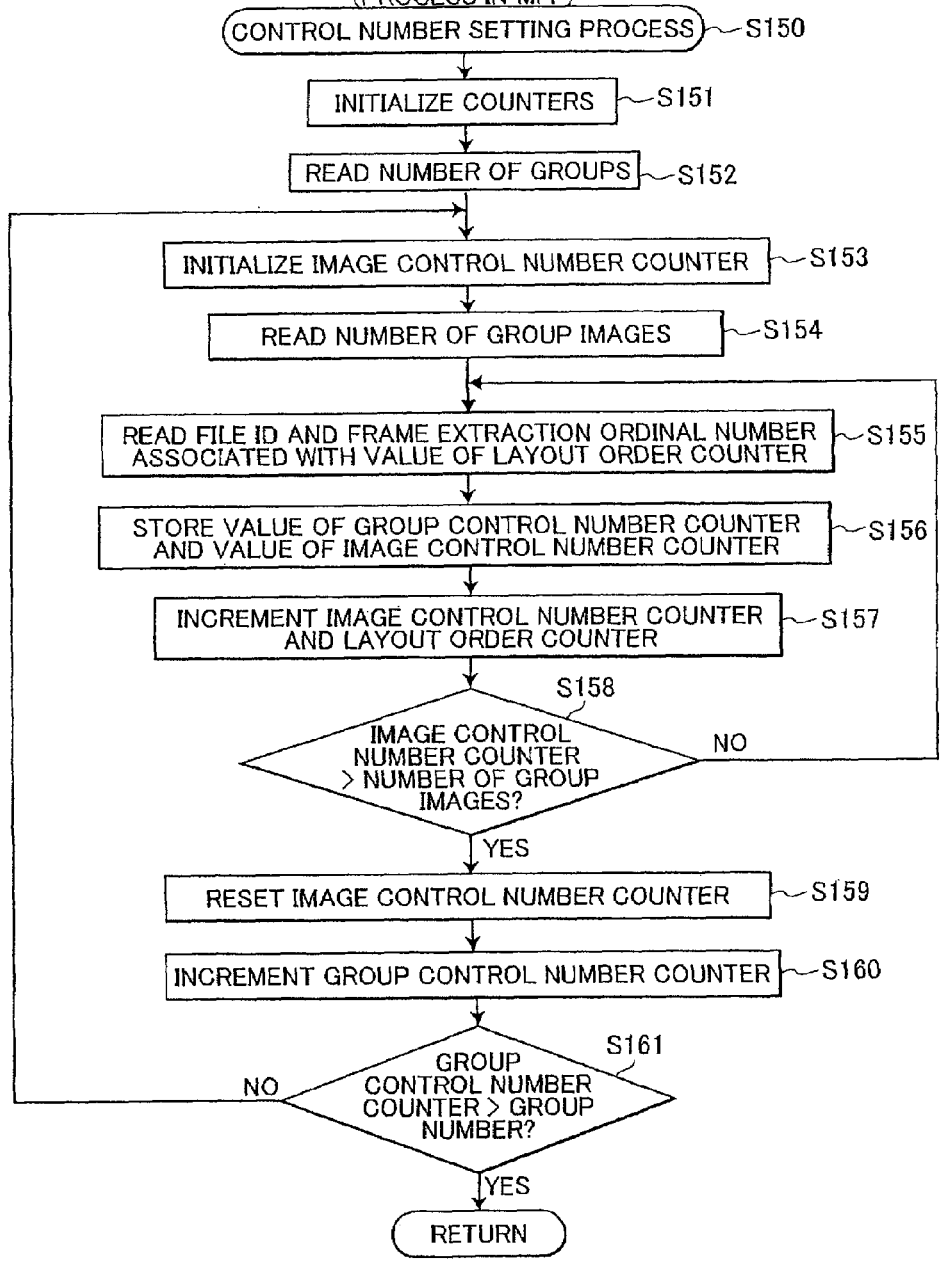
FIG. 12 is a flowchart illustrating steps in a control number setting process.

FIG. 12 is a flowchart illustrating steps in the control number setting process of S150. In S151 at the beginning of this process, the CPU 11 initializes a group control number counter to "1" and a layout order counter to "0". In S152 the CPU 11 reads the number of groups generated during the layout order setting process from the total group number storage area 401 shown in FIG. 6. In S153 the CPU 11 initializes an image control number counter to "1".

In S154 the CPU 11 reads the number of group images associated with the group number equivalent to the group control number counter from the group image number storage area 404 shown in FIG. 6. In S155 the CPU 11 reads the file ID and the frame extraction ordinal number associated with the value of the layout order counter from the layout data storage area 13i shown in FIG. 5.

In S156 the CPU 11 stores the value of the group control number counter and the value of the image control number counter in the group number storage area 501 and image control number storage area 502, respectively, of the image control data storage area 13n shown in FIG. 7. In addition, the CPU 11 stores the file ID and the frame ordinal number in the file ID storage area 503 and the frame ordinal number storage area 504, respectively, of the image control data storage area 13n. Through this process, the CPU 11 can assign the value of the image control number counter as a control number to each item of frame image data and each still image file identified by the file ID and the frame extraction ordinal number.

In S157 the CPU 11 increments the image control number counter and the layout order counter by "1" and in S158 determines whether the value of the image control number counter is greater than the number of group images stored in the group image number storage area 404. If not (S158: NO), the CPU 11 repeats the above process from S153.

However, if the value of the image control number counter is greater than the number of group images (S158: YES), in S159 the CPU 11 resets the image control number counter to "1" and in S160 increments the group control number counter by "1". In S161 the CPU 11 determines whether the value of the group control number counter is greater than the group number. If not (S161: NO), the CPU 11 repeats the above process from S153.

When the CPU 11 determines that the value of the group control number counter is greater than the group number after repeating the above process (S161: YES), the CPU 11 ends the control number setting process of S150.

Next, the layout printing process of S200 will be described with reference to FIG. 13. FIG. 13 is a flowchart illustrating steps in the layout printing process of S200. The CPU 11 executes the layout printing process of S200 after performing the control number setting process of S150 described with reference to FIG. 12 in order to print out the image lists 20 on recording paper.

In S201 at the beginning of the layout printing process, the CPU 11 reads the horizontal layout number indicating the number of index images 21, 22 arranged in a row of the image list 20 from the horizontal image layout number storage area 12b. In S202 the CPU 11 reads the page layout number indicating the number of index images 21, 22 that can be laid out on a single page of the image list 20 from the page image layout number storage area 12c.

In S203 the CPU 11 initializes a group counter to "1" and in S204 initializes a page counter to "1". The page counter is stored in the counter storage area 13m shown in FIG. 2.

In S205 the CPU 11 reads the number of group images associated with the group number equivalent to the value of the group counter from the group image number storage area 404. In S206 the CPU 11 calculates a page generation number indicating the number of pages of the image list 20 to print out for the targeted group based on the number of group images read in S205 and the page layout number. The CPU 11 stores the calculated page generation number in the page generation number storage area 13d shown in FIG. 2. In the embodiment, the page generation number is calculated using Equation 1-6 below, for example.

(Page generation number)=[(number of group images)/(page layout number)]+1  (Equation 1-6)

In S207 the CPU 11 initializes a layout image counter to "0" and in S208 calculates an image number layout_no indicating the number of images to be laid out on one sheet of recording paper. In the embodiment, the image number layout_no is calculated according to Equation 1-7 below.

When (page counter)<page generation number, layout_no=(page layout number)

When (page counter)>page generation number, layout_no=(group image number)−{(page layout number)×(page counter)−1}   (Equation 1-13)

In S209 the CPU 11 reads the file ID and the frame extraction ordinal number corresponding to the layout order from the layout data storage area 13$i$ (FIG. 5). In S210 the CPU 11 determines whether the image file corresponding to the file ID read in S209 is a video file or a still image file.

If the CPU 11 determines that the image file is a video file (S210: video), then in S211 the CPU 11 extracts frame image data for one frame corresponding to the frame extraction ordinal number from the video file.

In S212 the CPU 11 performs a decoding process on the extracted frame image data and stores the decoded data in the decoded data storage area 13$k$. In S212$a$ the CPU 11 generates video index data for outputting a video index image 21 described with reference to FIG. 3 by reducing or enlarging the decoded frame image data to the prescribed size and adding the assigned control number (i.e., the control number associated with the file ID and the frame extraction ordinal number of the target frame image data shown in FIG. 7). In S213 the CPU 11 lays out the video index data generated in S212$a$ at a prescribed position in a layout buffer provided in the RAM 13 shown in FIG. 2.

However, if the CPU 11 determines that the image file is a still image file (S210: still image), in S214 the CPU 11 performs a decoding process on the still image file identified by the file ID corresponding to the layout order number and stores the decoded data in the decoded data storage area 13$k$. In S214$a$ the CPU 11 generates still image index data for outputting a still image index image 22 described with reference to FIG. 3 by reducing or enlarging the decoded still image file to the prescribed size and adding the assigned control number. In S215 the CPU 11 lays out the still image index data generated in S214$a$ at a prescribed position in the layout buffer.

After performing processes to decode either frame image data or a still image file and to layout the decoded data in the layout buffer, in S216 the CPU 11 determines whether the layout process has been performed a number of times equivalent to the horizontal layout number, which is the upper limit of the number of images that can be laid out in a row. If not (S216: No), in S220 the CPU 11 updates a horizontal position indicating the next layout position for data in the buffer.

In S221 the CPU 11 increments the layout image counter by "1" and in S222 determines whether the value of the layout image counter is greater than or equal to the image number layout_no of the index images 21 and 22 to be arranged on the current sheet of recording paper. If not (S222: NO), the CPU 11 returns to S209 and processes layout data corresponding to the next layout order number.

By repeatedly performing the above process, the MFP 1 extracts frame image data for a number of frame images equivalent to the frame extraction number from each video file stored on the media card and lays out the frame image index data in the layout buffer. At the same time, the MFP 1 extracts still image files stored on the media card and lays out the still image index data in the layout buffer.

When the above layout process has been executed a number of times equivalent to the horizontal layout number (S216: YES), in S217 the CPU 11 transfers data from the layout buffer to the printer 3 shown in FIG. 2. Hence, the MFP 1 provides data corresponding to one row worth of index images 21 and 22 in the layout buffer to the printer 3 so that the printer 3 can perform a printing process to output the image list 20.

In S218 the CPU 11 initializes the horizontal position indicating the horizontal layout position in the layout buffer for the next index image 21 or 22 and in S219 updates a vertical position indicating the vertical layout position in the layout buffer for the next data. Based on the horizontal layout position and the vertical layout position, the CPU 11 sets the layout position for the next data in the layout buffer so that the next index images 21 and 22 are arranged in the next row of the image list 20 beginning from the left end thereof. Subsequently, the CPU 11 executes the processes in S221 and S222 described above.

After completing the above process for all index images 21 and 22, i.e., when the layout image counter is greater than or equal to the image number layout_no (S222: YES), the CPU 11 advances to S223 of FIG. 14.

Figure 13:
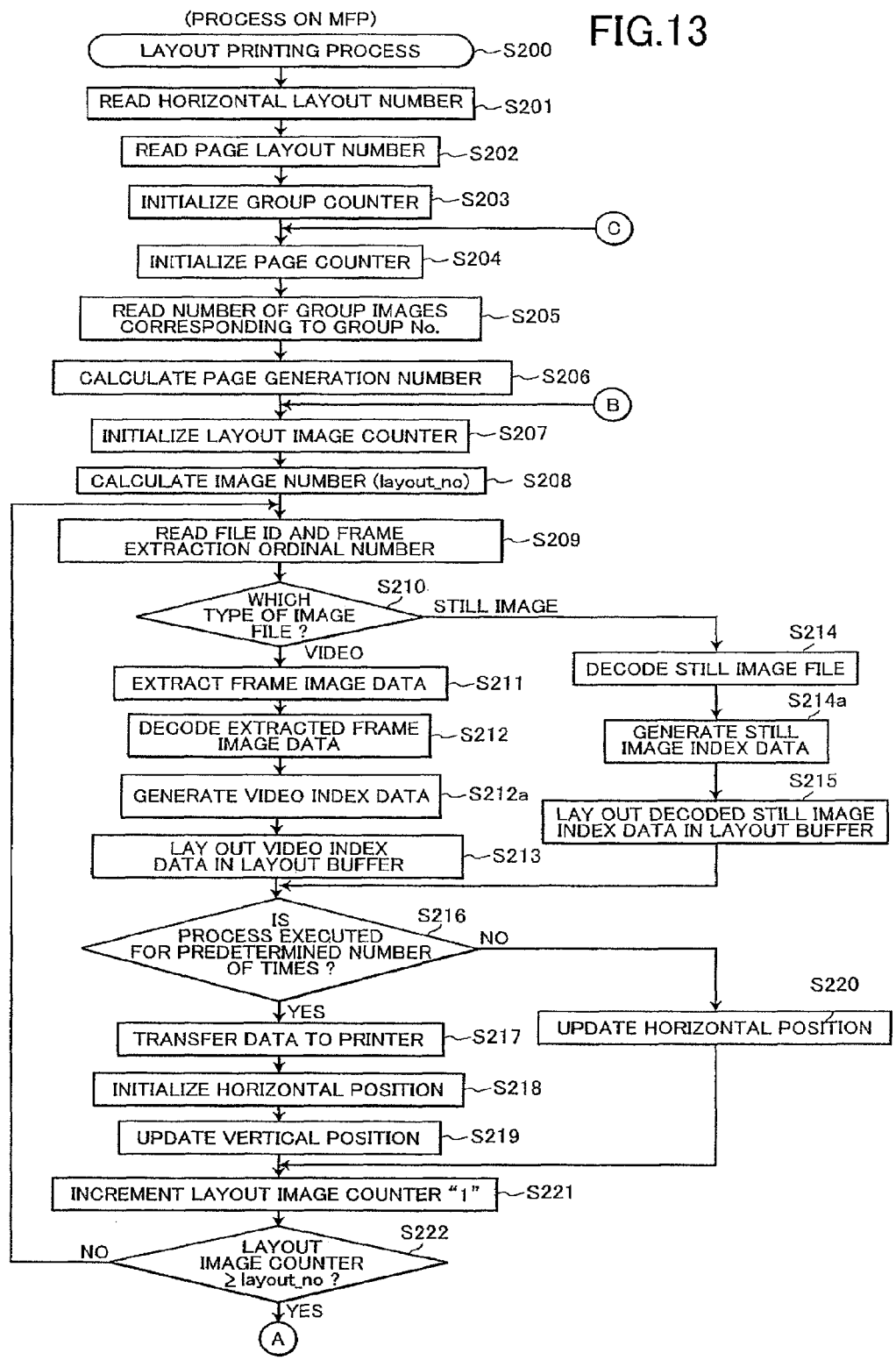
FIG. 13 is a flowchart illustrating a part of steps in a layout printing process.
Figure 14:
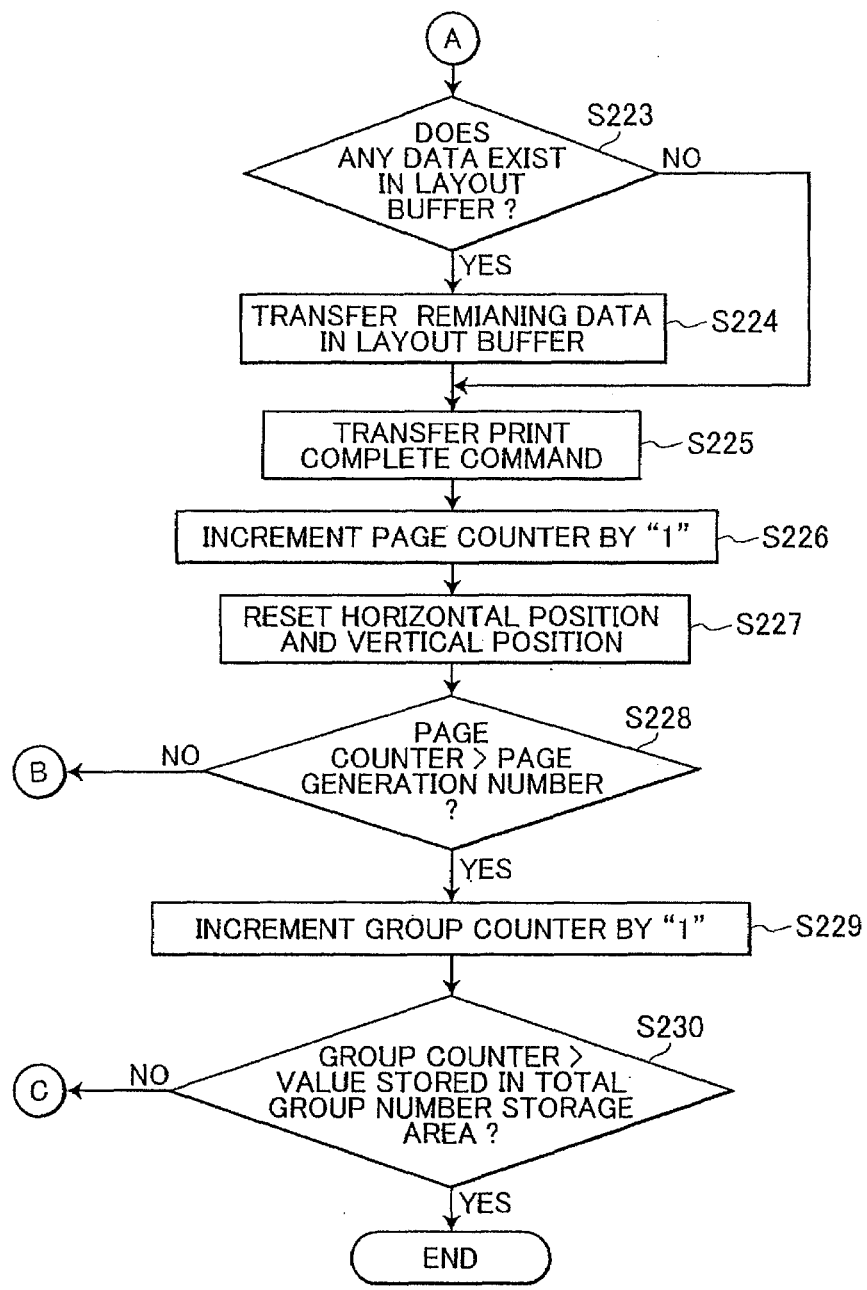
FIG. 14 is a flowchart illustrating a remaining part of steps in the layout printing process of FIG. 13.

FIG. 14 is a flowchart illustrating continuing steps in the layout printing process of FIG. 13. The steps in FIG. 14 are executed after a YES determination is made in S222 of FIG. 13.

In S223 of FIG. 14 the CPU 11 determines whether any data exists in the layout buffer that has not yet been printed. If so (S223: YES), in S224 the CPU 11 transfers the remaining data to the printer 3 for printing and subsequently advances to S225. Here, in S224 when the CPU 11 lays out no frame image in a region of the layout buffer, the CPU 11 outputs white color data with respect to this region. However, if there remains no data to be printed in the layout buffer (S223: NO), the CPU 11 skips S224 and advances directly to S225.

In S225 the CPU 11 transfers a print complete command to the printer 3 indicating that the output of one page worth of data is complete. In S226 the CPU 11 increments the page counter by "1". In S227 the CPU 11 resets the horizontal position and the vertical position indicating the layout position in the layout buffer for the next data. In S228 the CPU 11 determines whether the value of the page counter is greater than the page generation number indicating the number of pages of the image list 20 to print out for the current target group. If not (S228: NO), the CPU 11 returns to S207 of FIG. 13 and begins processing the next page for the same group.

However, if the page counter is greater than the page generation number (S228: YES), in S229 the CPU 11 increments the group counter by "1". In S230 the CPU 11 determines whether the value of the group counter is greater than the value stored in the total group number storage area 401. If not (S230: NO), the CPU 11 returns to S204 and repeats the process described above. Hence, the CPU 11 repeats the above process targeting the group identified by the next group number.

However, if the value of the group counter is greater than the value stored in the total group number storage area 401 (S230: YES), the CPU 11 ends the layout printing process of S200. Through this process, the MFP 1 outputs the image lists 20 described with reference to FIG. 3.

Next, an example of using the control numbers printed in the image list 20 will be described.

Figure 15:
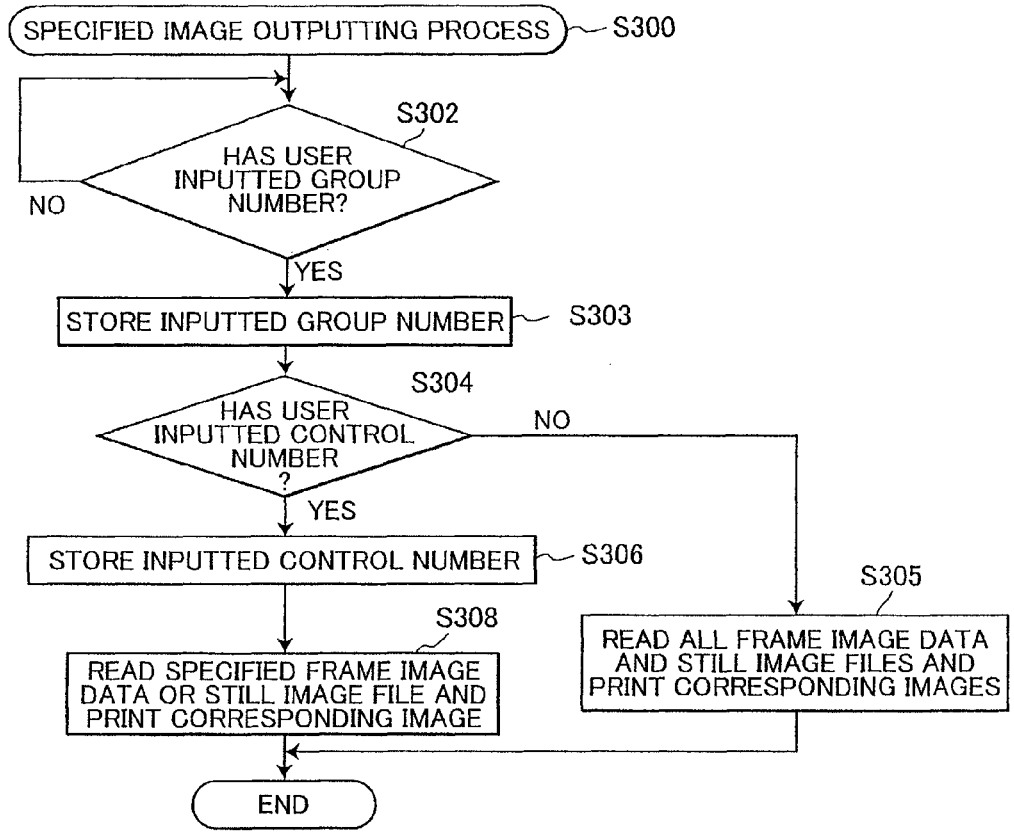
FIG. 15 is a flowchart illustrating steps in a specified image outputting process.

FIG. 15 is a flowchart illustrating steps in the specified image outputting process of S300. The specified image outputting process is performed to print out only images specified by the user.

In S302 at the beginning of the specified image outputting process, the CPU 11 determines whether the user has inputted a group number via the operating section 4. The CPU 11 continues to wait at S302 while the user has not inputted a group number (S302: NO) and in S303 stores the inputted group number when a group number has been inputted (S302: YES).

In S304 the CPU 11 determines whether the user has inputted a control number. If the CPU 11 determines that a control number has not been inputted, such as when a prescribed time has elapsed while waiting for input or when the user has inputted a print command without inputting a control number (S304: NO), in S305 the CPU 11 reads all frame image data and still image files sorted into the group specified by the group number stored in S303 and prints out the corresponding frame images and still images at a uniform size.

However, if a control number has been inputted (S304: YES), in S306 the CPU 11 stores the inputted control number. In S308 the CPU 11 reads the specified frame image data or still image file assigned the stored control number stored from among the frame image data and the still image files sorted into the group specified by the group number stored in S303, and prints out the corresponding frame image or still image at the prescribed size. Subsequently, the CPU 11 ends the specified image outputting process.

Since the user can view the group number and control number in the image list 20 as described with reference to FIG. 3, by launching the specified image outputting process of S300, the user can print out images for only frame image data and still image files included in a desired group and can print out desired images using the control numbers.

<Second Embodiment>

Next, a multifunction peripheral (MFP) 2001 according to a second embodiment will be described, wherein like parts and components are designated with the same reference numerals to avoid duplicating description.

The RAM 13 is provided with the frame extraction number storage area 13a, the process file number storage area 13b, the total process image number storage area 13c, the page generation number storage area 13d, the group data storage area 13g, the file data storage area 13h, the layout data storage area 13i, the frame image data storage area 13j, the decoded data storage area 13k, the counter storage area 13m, and an identification image storage area 13o. In the second embodiment, the RAM 13 does not includes the image control data storage area 13n.

The identification image storage area 13o stores sets of identification image data corresponding to identification images indicating which index images are extracted from the same video file. The identification image is configured of a transparent region in which the index image is arranged, and a colored region surrounding the transparent region.

A color is specified in image identifying data described later and the colored region is colored by the specified color. The corresponding index image is then laid out in the transparent region surrounded by the colored region, and the entire image is printed out. The color of the colored region is set differently for each video file and is set to the same color for index images extracted from the same video file.

FIG. 17(a) shows an example of the image list 20 that the MFP 2001 prints out on one sheet of a recording paper. As shown in FIG. 17(a), in the second embodiment, video index images 21 extracted from single video file is designated with the same reference numeral, for example, 21a, 21b, or 21c. That is, index images 21a, for example, in FIG. 3 are extracted from single video file. Sets of index images 21a, 21b, and 21c corresponding to frame image data, and index images 22 corresponding to still image files are laid out in the image list 20 according to an order based on a prescribed condition. Each set of the index images 21a, 21b, and 21c corresponds to one or more frame image data extracted from a single video file.

When still image files and video files are combined on a media card, the MFP 2001 outputs an image list 20 having a combination of index images 21a, 21b, and 21c corresponding to frame image data and index images 22 corresponding to still image files, as shown in FIG. 17(a). Accordingly, the user can perceive that the index images 21a, 21b, and 21c indicate content of video files and that the index images 22 indicate content of still image files at a glance when viewing a single page of the image list 20, making browsing more user-friendly.

The four index images 21a correspond to frame image data extracted from a first video file for four frame images. Each of the index images 21a is surrounded by a frame F1 (the colored region) formed in a first color, such as blue.

The two index images 21b correspond to frame image data extracted from a second video file different from the first video file for two frame images. Each of the two index images 21b is surrounded by a frame $F_2$ formed in a second color different from the first color, such as green.

The three index images 21c correspond to frame image data extracted from a third video file different from the first and second video files for three frame images. Each of the three index images 21c is surrounded by a frame F3 formed in a third color different from the first and second colors, such as red.

Therefore, frames of the same color are added to index images extracted from the same video file before the image list 20 is printed out.

FIG. 17(b) shows an example of an image list 20 in which the frames F1, F2, and F3 shown in FIG. 17(a) have not been added to the index images 21a, 21b, and 21c. When comparing the image lists 20 in FIGS. 17(a) and 17(b) side by side, it is easy to see how the user can more quickly tell which index images are extracted from the same video file based on the colors of the frames F1, F2, and F3 shown in FIG. 17(a).

The MFP 2001 also determines a layout order for each of the index images 21a, 21b, 21c, and 22 so that the group of images is arranged in an order based on the capture date and time of the images, and prints out the image list 20 having the index images 21a, 21b, 21c, and 22 arranged according to this predetermined layout order.

Although FIG. 17(a) is merely one example of the image list 20, the MFP 2001 determines the layout order of the index images 21a, 21b, 21c, and 22 so that one row of images having earliest capture dates and times is arranged from left to right in the image list 20, and thereafter a row of images having the next earliest capture dates and times is arranged below the previous row.

As will be described later in greater detail, the MFP 2001 determines a layout order for sorting the index images 21a, 21b, 21c, and 22 in the image list 20 based on the capture date and time, not on whether the index images are based on a still image file or a video file. Hence, even if the user cannot remember whether a desired image is a still image or a video, for example, the user can quickly find the desired image based on the capture date and time, i.e., whether the image was taken some time ago or fairly recently.

Further, as will be described later, the MFP 2001 according to the second embodiment sorts the index images 21a, 21b, 21c, and 22 into groups for each capture date and outputs an image list 20 for each group. Thus, the MFP 2001 may also print a capture date 23 for each group in a header portion of the corresponding image list 20, for example.

FIG. 18 conceptually illustrates the structure of the file data storage area 13h. As shown in FIG. 18, similarly to the first embodiment, the file data storage area 13h includes the file ID storage area 201 storing file IDs, the file name storage area 202 storing filenames, the file type storage area 203 storing file types, the frame extraction number storage area 204 storing frame image extraction numbers, the total frame number storage area 205 storing total frame numbers, the fps data storage area 206 storing frames per second data, the file date data storage area 207 storing file date data, and the file time data storage area 208 storing file time data. Further, in the second embodiment, the file data storage area 13h stores. The image identifying data storage area 209 for storing image identifying data. So, file data records 200 are each configured of a filename, file type, frame extraction number, data of total frame number, fps data, file date data, file time data, and image identifying data.

The image identifying data storage area 209 stores image identifying data indicating the color used for forming the colored region of the identification image corresponding to the identification image data stored in the identification image storage area 13o. The MFP 2001 calculates the image identifying data In S106a of the layout order setting process described later with reference to FIG. 21 so that the image identifying data is different for each video file.

FIG. 19 conceptually illustrates the structure of the layout data storage area 13i. Similarly to the first embodiment, the layout data storage area 13i is provided with the layout order storage area 301, the file ID storage area 302, the group number storage area 303, the frame extraction ordinal number storage area 304, the image date data storage area 305, and the image time data storage area 306. Further, in the second embodiment, the layout data storage area 13i stores an image identifying data storage area 307.

The image identifying data storage area 307 stores image identifying data for each frame image. Since image identifying data is calculated to be different for each video file, the same image identifying data is stored in the image identifying data storage area 307 in association with frame image data extracted from the same video file for an individual frame image.

In the layout printing process described later with reference to FIG. 22, the MFP 2001 prints out the image list 20 (see FIG. 17) in which the same identification image (i.e. an identification image whose frame-like colored region has the same color) is combined with index images extracted from the same video file, and prints out the image list 20 with the index images laid out in an order based on the capture date and time.

The MFP 2001 according to the second embodiment also sorts index images into groups for each capture date and prints out an image list 20 for each group. For example, if the media card stores image files taken on Jan. 15, 2008 and image files taken on Jan. 20, 2008, the MFP 2001 prints out one image list 20 including index images for the image files taken on Jan. 15, 2008 and one image list 20 including index images for the image files taken on Jan. 20, 2008.

The MFP 2001 according to the second embodiment can provide the user with one image list 20 for each group, where each group includes index images generated from video files or still image files having the same capture date. By allowing the user to view an image list 20 for each group, the MFP 2001 can provide image lists 20 that are easy to browse.

Figure 20:
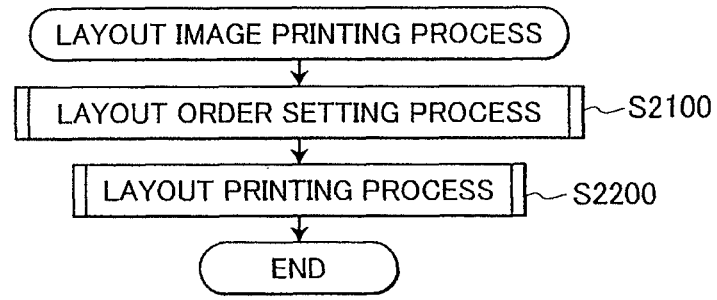
FIG. 20 is a flowchart illustrating steps in a layout image printing process executed on the MFP according to the second embodiment.

FIG. 20 is a flowchart illustrating steps in a layout image printing process executed on the MFP 1. The MFP 1 executes the layout image printing process when the user inputs a command to output an image list.

In S2100 at the beginning of the layout image printing process, the CPU 11 of the MFP 1 executes a layout order setting process for setting the layout order of the index images 21 and 22. In S2200 the CPU 11 executes a layout printing process for outputting the image list 20 described with reference to FIG. 3 based on the layout order and control numbers set in S100 and S150. Next, each process will be described in greater detail.

FIG. 21 is a flowchart illustrating steps in a layout order setting process. The CPU 11 performs the layout order setting process of S2100 shown in FIG. 21 when a media card is mounted in the slot section 6 and the user has inputted an instruction to print out image lists 20.

The layout order setting process of S2100 is performed to acquire image date data and image time data indicating the capture date and time of image data for each item of frame image data extracted from video files and each still image file read from the media card, and to set a layout order for index images based on the acquired image date data and image time data.

The layout order setting process of S2100 is basically the same with the layout order setting process of S100 in the first embodiment except steps S2103, S106a, S2107, S1115, S2122, and S1119. In the following description, only steps S2103, S106a, S2107, S1115, S2122, and S1119 are explained.

In S2103 the CPU 11 initializes a file counter, a process image counter, a frame extraction counter, a video file counter to "0". These counters are stored in the counter storage area 13m shown in FIG. 2.

In S106a the CPU 11 calculates image identifying data for the video file based on a value indicated by the video file counter. More specifically, the MFP 2001 finds values ColH, ColS, and ColV corresponding to the H, S, and V components defined in the HSV color space using the following equations, where MIndex is the value stored in the video file counter.

$$ColH = (Mindex \times 67) \bmod 360$$

$$ColS = 1.0$$

$$ColV = 1.0$$

Here, the H component takes a value between 0 and 360, and the S and V components take values between 0.0 and 1.0.

Next, the CPU 11 calculates image identifying data for the currently targeted video file by converting the ColH, ColS, and ColV calculated in the above equations to RGB values in the RGB color space, where the RGB values are each values within the range 0-255. H, S, and V in the above description denote hue, saturation, and value (lightness). Equations for converting values in the HSV color space to values in the RGB color space are common and will not be described here.

By calculating image identifying data having RGB values converted from different color components in this way for each video file, the MFP 2001 can reliably generate different image identifying data for each video file. Further, the value "67" is used as a coefficient for calculating ColH in the embodiment, enabling the MFP 2001 to generate image identifying data having greater differences between video files and ensuring that the generated image identifying data is different for each video file, even when a large number of video files are stored on the media card.

In S2107 the CPU 11 stores the acquired file date data, file time data, fps data, and image identifying data in the respective file date data storage area 207, the file time data storage area 208, the fps data storage area 206, and the image identifying data storage area 209 associated with the layout order number equivalent to the process image counter.

In S1115 the CPU 11 stores the image identifying data corresponding to the video file from which the frame image is generated in the image identifying data storage area 307. In S2122 the CPU 11 increments the video file counter by "1".

In S1119 the CPU 11 stores a "0" in the image identifying data storage area 209 and the image identifying data storage area 307. In S123 the CPU 11 increments the process image counter by "1" and advances to S123.

After completing the process in S101-S123 described above, the CPU 11 has stored a file ID, frame extraction ordinal number, image date data, image time data, and image identifying data in the layout data storage area 13i. After S123, the CPU 11 executes the same steps S124-S136 shown in FIG. 11 in the first embodiment. Thus, the layout order of the index images is determined in S124-S136. That is, the CPU 11 sorts the layout data based on the image date data and the image time data to determine the layout order according to the capture date and time.

FIG. 22 is a flowchart illustrating steps in the layout printing process of S2200. The layout printing process of S2200 is basically the same with the layout printing process of S200 in the first embodiment except that the layout printing process of S2200 does not execute steps S209, S212a and S214a, but execute steps S2209 and S213a. In the second embodiment, step S2209 is executed between steps S208 and S210, step S215 is executed between step S214 and S216, and step S213a is executed between steps S213 and S216.

In S2209 the CPU 11 reads the file ID and the frame extraction ordinal number, and image identifying data corresponding to the layout order from the layout data storage area 13i.

In S213a the CPU 11 combines the identification image data with the frame image data laid out in the layout buffer. More specifically, first, the CPU 11 identifies, based on the image identifying data read in S209, the color for forming the color region of the identification image that is corresponds to the identification image data stored in the identification image storage area 13o. Next, the CPU 11 combines the identification image data with the frame image data to form a composite image in which the frame image (index image) is located in the transparent region of the identification image having a colored region with the identified color.

The CPU 11 executes the same steps with S223-S230 shown in FIG. 14 described in the first embodiment.

As described with reference to FIG. 17(a), the MFP 2001 according to the second embodiment enables the user to perceive at a glance when index images are extracted from the same video file based on the colors of the frames F1, F2, and F3 combined with the corresponding index images 21a, 21b, and 21c, when the image list 20 includes index images extracted from a plurality of video files and index images extracted from a plurality of still image files. The MFP 2001 can also output an image list 20 in which index images are arranged in a layout order based on the file time data (the capture time of the still image file or frame image data).

In the layout printing process of S2200 described above, the MFP 2001 prints out an image list 20 for each group, with index images within the same group arranged in order of smallest image time data. Accordingly, the user can acquire an image list that is easy to browse since the index images are arranged in order of their capture time, even when a single group includes a large number of index images.

Next, a MFP 2001 according to the second embodiment will be described with reference to FIGS. 23(a) and 23(b).

The MFP 2001 according to the first embodiment described above adds an identification image in the same color to index images extracted from the same video file and outputs the resulting image list 20, as shown in FIG. 17(a).

<Modification of Second Embodiment>

Next, a modification of the second embodiment will be described. The MFP 2001 according to the modification of the second embodiment adds a clock image to index images extracted from the same video file as the identification image to indicate the time assigned to each video file, and subsequently outputs the resulting image list 20.

Figure 16:
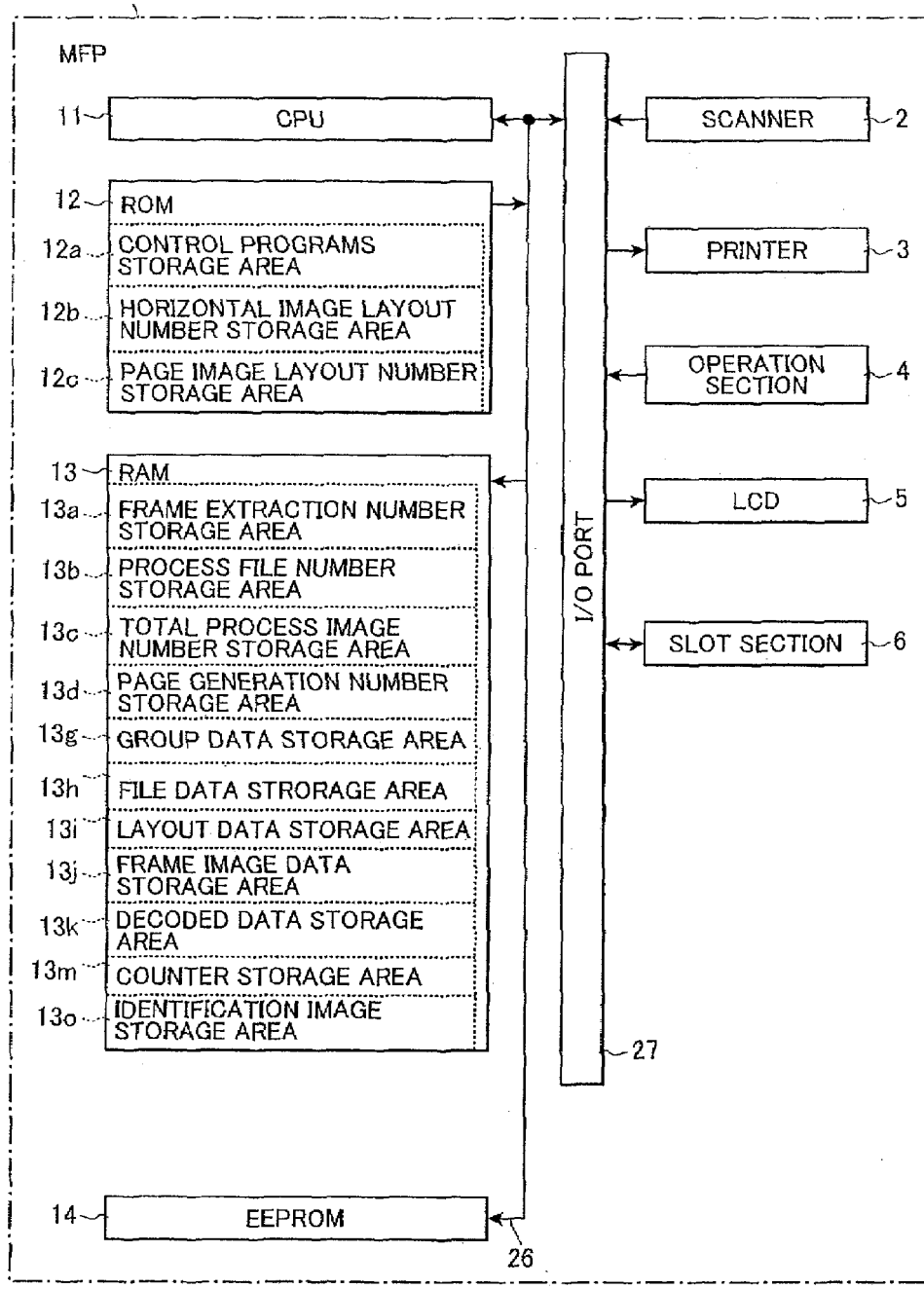
FIG. 16 is a block diagram showing an electrical structure of an MFP according to a second embodiment.

Below, aspects of the MFP 2001 according to the modification of the second embodiment different from the first embodiment will be described. In the MFP 2001 according to the second embodiment, data for a clock image C (the image excluding a long hand L and a short hand S) shown in FIG. 23(a) is stored in the identification image storage area 13o of the RAM 13 shown in FIG. 16 as the identification image data. The image identifying data includes data for positions of the long hand L and the short hand S. The positions of the long hand L and the short hand S in the clock image C are identified by the image identifying data, and images of the long hand L and short hand S are added to the clock image C at the identified positions and combined with the index image before being printed.

The image identifying data identifying the positions of the long hand L and the short hand S is set to the file time data acquired from the video file in S106 of the layout order setting process shown in FIG. 21 and is stored in the image identifying data storage area 209 in S107. The image identifying data calculated in S106a is stored in the image identifying data storage area 307 in S1115 between S111 and S113. The file time data and the image time data include hour data indicating the hour and minute data indicating the minute.

In S213a of the layout printing process shown in FIG. 22, the CPU 11 combines the clock image C with the long hand L and the short hand S added as identification data to the frame image data stored in the layout buffer as follows. First, the CPU 11 extracts the hour data and minute data from the file time data read in S2209 as the image identifying data. Next, the CPU 11 overwrites the regions that meet the conditions found in Equations (2-1) and (2-2) below in black in order to add the long hand L and the short hand S to the clock image C stored in the identification image storage area 13o.

Points P(R, T) in the clock image C are expressed in polar coordinates having a radial coordinate R and an angular coordinate T, where the pole is the center of the clock image C. The coordinates T and R are found for the short hand S and the long hand L in the following equations, where hour is the hour data, min is the minute data, and width is the width of the clock image C.

For short hand S (Equation 2-1)
$$T = 30 \times \{(27 - \text{hour}) \bmod 60\} \text{ and } R < \frac{\text{width}}{3}$$

For long hand L (Equation 3-2)
$$T = 6 \times \{(75 - \text{min}) \bmod 60\} \text{ and } R < \frac{\text{width}}{2}$$

Through these calculations, the MFP 2001 can add a clock image C indicating the same time to each index image extracted from the same video file. FIG. 23(b) shows an example of an image list 20 that the MFP 2001 according to the modification of the second embodiment prints out. As shown in FIG. 23(b), a clock image C1 indicating the approximate time 12:15 is merged with the four index images 21a in the image list 20, a clock image C2 indicating the approximate time 10:20 is merged with the two index images 21b, and a clock image C3 indicating the approximate time 9:05 is merged with the three index images 21c.

In this way, the user can discern at a glance which index images are extracted from the same video file based on the times indicated in the clock images C1, C2, and C3, even when the image list 20 includes a combination of index images extracted from a plurality of video files and index images extracted from still image files.

In the second embodiment described above, the MFP 2001 combines a frame F or a clock image C to index images extracted from the same video file, enabling the user to discern index images extracted from the same video file based on the color of the frame F or the time displayed in the clock image C, but the image merged with the index images is not restricted to these examples. For example, the MFP 2001 may combine letters, numbers, symbols or the like with the index images, and may be combine two or more of such letters, numbers, and symbols, as well as colors and graphics. Further, rather than adding an identification image to each index image individually, the MFP 2001 may add a graphic linking or encircling all index images extracted from the same video file.

In the second embodiment described above, the MFP 2001 outputs an image list 20 for each of the groups, but the MFP 2001 may be configured to output an image list 20 only for a group selected by the user, for example.

In the second embodiment, the frame extraction number storage area 13a stores a "frame image extraction number. However, the frame image extraction number may also be stored in the ROM 12 or the like in advance or may automatically be set according to a predetermined relationship. For example, the frame image extraction number may be set increasingly larger for increasingly large sizes of video files.

While the invention has been described in detail with reference to the above embodiments thereof, it would be apparent to those skilled in the art that various changes and modifications may be made therein without departing from the spirit of the invention.

For example, while the image list 20 is printed on recording paper in the embodiments, the invention may also be applied to a case in which the image list 20 is displayed on the LCD 5 or another display unit.

The invention may also be applied to a personal computer, for example, whereby the image list 20 is displayed on the monitor of the personal computer or is printed out on a printer through control by the personal computer.

In the embodiments described above, both the video files and the still image files are generated through digital photography, but the invention may be applied to video files and still image files generated according to another method. In this case, the device may set the layout order of the index images 21, 22 based on a condition other than the capture date and time, such as the file creation date and time indicating the date and time that the file was created or the modified date and time of the file.

Further, while still image files and video files are combined on the media card in the embodiments described above, the invention may also be applied to a case in which only video files are stored on the media card.

Further, while image data stored on a writable media card is the target of processing in the embodiments, the invention may also be applied when targeting image data stored in internal memory of the MFP 1.

In the embodiments described above, the capture date is used as the condition for sorting groups. However, images may be sorted in groups based on the month or year that the images were captured. Alternatively, images taken relatively close to each other in time may be sorted into the same group. The user may specify the condition on the operating section 4 in advance, or a condition may be fixed in advance.

Further, the MFP 1 may set the layout order and sort the index images 21 and 22 based on a condition other than the condition described in the embodiments. For example, the MFP 1 may sort image data based on a dynamic range of color brightness, an average brightness, the presence of faces in the image, or another condition.

What is claimed is:

1. An image processor accessible to a storage medium configured to store at least one set of moving image data each comprising a plurality of first sets of frame image data corresponding to a plurality of frame images, each set of the at least one set of moving image data corresponding to a moving image and comprising time-and-date information indicating a capture start time and date for the moving image, the image processor comprising:
    an extracting unit configured to extract a plurality of second sets of frame image data from the plurality of first sets of frame image data comprised in one of the at least one set of moving image data;
    an assigning unit configured to assign a set of control data to each set of the plurality of second sets of frame image data extracted by the extracting unit;
    a frame-date information calculator configured to calculate a set of frame-date information for each set of the plurality of second sets of frame image data based on the time-and-date information for the one of the at least one set of moving image data, the set of frame-date information indicating a capture date of a corresponding one of the plurality of second sets of frame image data;
    a frame image data classifier configured to classify each set of the plurality of second sets of frame image data into one of a plurality of groups based on the set of frame-date information of each set of the plurality of second sets of frame image data, such that the plurality of second sets of frame image data comprised in the one of the at least one set of moving image data are classified into different groups among the plurality of groups; and
    an output unit configured to output an image list by frame-date, the image list comprising a moving image index for only one of the different groups among the plurality of groups, the moving image index comprising an index frame image and information with respect to the set of control data, the index frame image being either one of a frame image corresponding to a particular set of frame image data and a resized frame image resized from the frame image corresponding to the particular set of frame image data,
    wherein one of the plurality of second sets of frame image data comprises the particular set of frame image data,
    wherein the particular set of frame image data is assigned with a set of control data assigned to the one of the plurality of second sets of frame image data, and
    wherein the particular set of frame image data is classified into one of the plurality of groups into which the one of the plurality of second sets of frame image data is classified.

2. The image processor according to claim 1,
    wherein the storage medium further is configured to store at least one set of still image data each corresponding to a still image, wherein the assigning unit further is configured to assign a set of control data to each of the at least one set of still image data, wherein the image list further comprises a still image index comprising information with respect to the set of control data and one of a still image corresponding to a set of still image data assigned with the set of control data and a resized image that is a resized version of the still image.

3. The image processor according to claim 2, further comprising:
a control data specifying unit configured to specify a set of control data; and
a specified image output unit configured to output either one of a set of frame image data assigned with the set of control data specified by the control data specifying unit and a set of still image data assigned with the set of control data specified by the control data specifying unit.

4. The image processor according to claim 3, wherein the frame image data classifier is configured to classify each of the at least one set of still image data into one of the plurality of groups,
wherein the output unit is configured to output the image list with respect to each of the groups.

5. The image processor according to claim 4,
wherein the assigning unit is configured to assign one set of control data to the set of still image data classified into one particular group and to at least one set classified into the one particular group from among the plurality of second sets of frame image data,
wherein each piece of control data from the sets of control data with respect to the one group is different from each other.

6. The image processor according to claim 4, further comprising:
a group specifying unit configured to specify a group; and
a specified group output unit configured to output both a set of frame image data classified into the specified group and a set of the still image data classified into the specified group.

7. An image processor comprising:
an acquiring unit configured to acquire a plurality of sets of moving image data and at least one set of still image data, each of the plurality of sets of moving image data comprising a plurality of sets of frame image data corresponding to a plurality of frame images, each of the plurality of sets of moving image data further corresponding to a moving image and further comprising time-and-date information indicating a capture start time and date for the moving image, and each of the at least one set of still image data comprising a set of still image data corresponding to a still image;
an extracting unit configured to extract sets of frame image data from each of the plurality of sets of moving image data;
an assigning unit configured to assign a set of identifying data to each of the sets of frame image data extracted by the extracting unit, the set of identifying data identifying the sets of frame image data that are comprised in one set of moving image data;
a frame-date information calculator configured to calculate a set of frame-date information for each of the sets of frame image data based on the time-and-date information for each of the plurality of sets of moving image data, the set of frame-date information indicating a capture date of a corresponding one of the sets of frame image data;
a frame image data classifier configured to classify each set of the sets of frame image data into one of a plurality of groups based on the set of frame-date information of each set of the sets of frame image data, such that the sets of frame image data comprised in each one of the plurality of sets of moving image data are classified into different groups among the plurality of groups; and
an output unit configured to output a set of output data by frame-date, the set of output data indicating an output image comprising both an output still image and an output frame image, the output still image corresponding to one of the at least one set of still image data, the output frame image corresponding to sets of frame image data comprising only one of the different groups among the plurality of groups and assigned with the set of identifying data,
wherein, when at least two sets of frame image data are extracted from one set of moving image data of the plurality of sets of moving image data, the assigning unit is configured to assign a same set of identifying data to each set of the at least two sets of frame image data extracted from the one set of moving image data,
wherein, when the extracting unit extracts a first set of frame image data from one set of the plurality of sets of moving image data and extracts a second set of frame image data from another set of the plurality of moving image data, the assigning unit is configured to assign a first set of identifying data to the first set of frame image data and a second set of identifying data, different from the first set of identifying data, to the second set of frame image data,
wherein one of the sets of frame image data comprises a particular set of frame image data corresponding to the output frame image,
wherein the particular set of frame image data is assigned with a set of identifying data assigned to the one of the sets of frame image data, and
wherein the particular set of frame image data is classified into one of the plurality of groups into which the one of the sets of frame image data is classified.

8. The image processor according to claim 7,
wherein each set of identifying data assigned by the assigning unit to each of the sets of frame image data extracted by the extracting unit corresponds to a set of identification image data,
wherein the image processor further comprises an image data combining unit configured to generate a set of combined frame image data by combining a particular set of frame image with a particular set of identification image data corresponding to the set of identifying data assigned to the particular set of frame image data,
wherein the output frame image is generated from the set of combined image data.

9. The image processor according to claim 7,
wherein each set of identification image data indicates at least one of a symbol, a numeric character, a letter, a color, and a figure.

10. The image processor according to claim 7, further comprising:
a number acquiring unit configured to acquire a total number of the plurality of sets of moving image data;
a counting unit configured to count a number of the plurality of sets of moving image data until the number becomes equal to the total number;
a color determining unit configured to determine color values based on the number, such that each of the color values is different from one another; and a setting unit configured to set a different color value of the color values as the set of identifying data for each of the sets of frame image data extracted by the extracting unit.

11. The image processor according to claim 10, wherein each of the color values comprises an H value, an S value, and a V value represented in an HSV color space.

12. The image processor according to claim 7, further comprising:
a time data acquiring unit configured to acquire a set of time data corresponding to the set of moving image data; and
a setting unit configured to set a set of time data as the identifying data.

13. The image processor according to claim 1, wherein the frame image data classifier is configured to classify the plurality of second sets of frame image data into the plurality of groups based on the set of frame-date information of each set of the plurality of second sets of frame image data, such that the plurality of second sets of frame image data comprised in the one of the at least one set of moving image data are classified into different groups among the plurality of groups when the sets of frame-date information corresponding to each set of the plurality of second sets of frame image data are different from one another.

* * * * *